(12) United States Patent
Korshunov et al.

(10) Patent No.: US 7,949,635 B1
(45) Date of Patent: May 24, 2011

(54) BACKUP SERVER ARCHITECTURE

(75) Inventors: Igor E. Korshunov, Moscow (RU);
Maxim V. Lyadvinsky, Moscow (RU);
Alexander G. Tormasov, Moscow (RU);
Serguei M. Beloussov, Singapore (SG)

(73) Assignee: Acronis Inc., Tortola (VG)

( * ) Notice: Subject to any disclaimer, the term of this patent is extended or adjusted under 35 U.S.C. 154(b) by 363 days.

(21) Appl. No.: 12/258,400

(22) Filed: Oct. 25, 2008

Related U.S. Application Data

(60) Provisional application No. 60/982,725, filed on Oct. 26, 2007.

(51) Int. Cl.
*G06F 7/00* (2006.01)
*G06F 17/00* (2006.01)
(52) U.S. Cl. .................................................. 707/636
(58) Field of Classification Search ........................ None
See application file for complete search history.

(56) References Cited

OTHER PUBLICATIONS

Freedman et al., "Democratizing Content Publication with Coral", NSDI'04 Proceedings of the 1st conference on Symposium on Networked Systems Design and Implementation, vol. 1, pp. 1-14, 2004.*

* cited by examiner

*Primary Examiner* — Michael Hicks
(74) *Attorney, Agent, or Firm* — Bardmesser Law Group

(57) ABSTRACT

A method for managing archived data includes creating a plurality of images of storage devices of computing systems and for, different users, each image being associated with a restore point of a particular storage device; storing the images for the different users in different storage locations, the storage locations being controlled by a single backup server and belonging to storage pools. Multiple locations of one user are stored in different pools on different storage devices. The method also involves moving contents of locations of one user from one pool to another in predefined direction, simultaneously with reorganizing images within the locations. Each image is a backup of one user's data. At least some of one location's content is frozen so that it is never moved from one pool to another. The storage devices of locations of different pools differ from each other by type, such that storage devices in a first pool are hard disk drives, storage devices in the next pool are SAN, or an NAS, and a storage device in the next pool is a network disk drive accessible through a network and a storage device in the next pool is a magnetic tape drive.

19 Claims, 35 Drawing Sheets

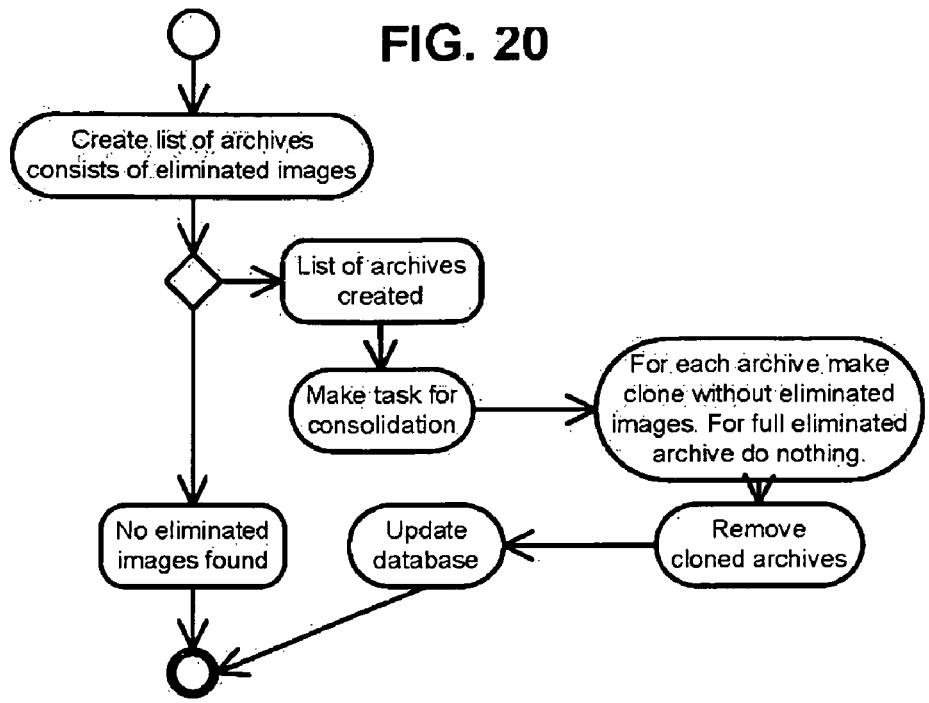
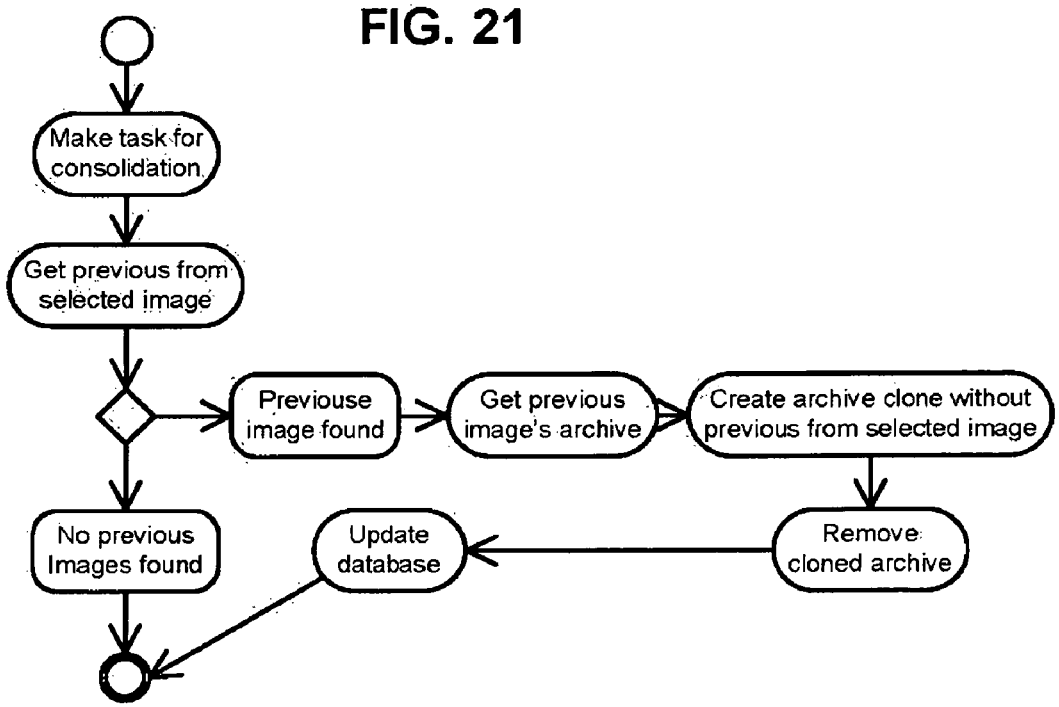

BACKUP SERVER ARCHITECTURE

CROSS REFERENCE TO RELATED APPLICATIONS

This application is a non-provisional of U.S. Provisional Patent Application No. 60/982,725, filed on Oct. 26, 2007, which is incorporated herein by reference in its entirety.

BACKGROUND OF THE INVENTION

1. Field of the Invention

The present invention relates to backups, and, more particularly, to an architecture for centralized backup of multiple computers and for multiple users.

2. Description of the Related Art

Currently, there are a number of conventional methods that relate to organization of data archiving. One of these methods is a backup of the entire hard drive, which typically involves copying of the hard drive content onto some other medium, such as another hard disk drive, a DVD ROM, a DVD RAM, a flash disk, and frequently including copying of the hard drive content over a network. The primary disadvantage of such a method is the need to backup what is frequently a very large amount of data. On the one hand, this results in a relatively lengthy process of archiving, and, on the other hand, frequently requires relatively large available space for the archived data. This ultimately results in a relatively high cost of archiving per unit of archived data and network overload.

Several software applications offers a single management tool to backup a user's data and to restore data from backup, while providing archive management. Also, they helps organizations take advantage of both tape and disk storage with its advances in disk- and snapshot-based protection, off-site media management, and automated disaster recovery.

Administrators can set up periodic schedules for automatic, unattended backup operations of users across the network. Backups can be full or incremental. A full backup contains all files, while an incremental backup only contains those files that changed since the last backup. An administrator can create systematic and complete backups over a period of time, and optimize network traffic.

Synthetic (consolidated) backups may be required for users that require quick restores and backups that do not put a heavy data transmission load on their network. Consolidated backups are automatically created from one full backup or a consolidated full backup and any number of incremental backups.

Consolidated backups allow for quick restore data from a single backup image. Consolidated backups consume less network bandwidth and decrease the impact on the application host.

The user initially needs to create a traditional full backup. After this, the user may no longer need to create traditional full backups. The user will be able to create consolidated full backups from other consolidated full backups. A user can then use the consolidated backup to restore data in the same way that a user would restore data from a traditional backup.

Creation of consolidated full backups takes place on a server instead of the client. One advantage of consolidating a full backup is that the processing of the backup is performed on the server and not on the client. During a traditional full backup, all files are copied from the client to a server, even though their data may not have changed since the last incremental backup.

Programs for managing backups provide a backup method for administrators to create images on disk initially, and then move them to another media type at a later point in time.

The number of operations with backups will be reduced, if consolidation of backups take place during the backups' migration to another storage device.

The present invention is based on these considerations, and it is an object thereof to provide a method for managing backups that is more efficient and has better operability.

SUMMARY OF THE INVENTION

The present invention relates to a centralized system for backup using a backup server that substantially obviates one or more of the disadvantages of the related art.

In one aspect, there is provided a system, method and computer program product for managing archived data, including creating a plurality of images of storage devices of computing systems and for, different users, each image being associated with a restore point of a particular storage device; storing the images for the different users in different storage locations, the storage locations being controlled by a single backup server and belonging to storage pools. Multiple locations of one user are stored in different pools on different storage devices; and moving contents of locations of one user from one pool to another in predefined direction, simultaneously with reorganizing images within the locations.

Each image is a backup of one user's data. At least some of one location's content is frozen so that it is never moved from one pool to another. The storage devices of locations of different pools differ from each other by type, such that storage devices in a first pool are hard disk drives, storage devices in the next pool are SAN, or an NAS, and a storage device in the next pool is a network disk drive accessible through a network and a storage device in the next pool is a magnetic tape drive.

The storage devices of locations of different pools have different access speed, such that the storage device in the first pool having the highest access speed. The client application for managing images is installed on the user's computer, and the server application for managing images is installed on a server. User's computers with installed client application for managing images are connected to the server, with the installed server application for managing images used to create the images.

User's computers with installed client application for managing images are connected to the server, with the installed server application for managing images to restore data from the images created by the users. A separate group server checks access rights of users to the backup server. The images belong to multiple users, and wherein each user can manage images based on his access rights. Some of the location's content can be deleted if it is out of data. One user's images selected for consolidation are all within one location or have been previously consolidated. A personal folder is created for each user, and all user's images are associated with the user's personal folder.

It is to be understood that both the foregoing general description and the following detailed description are exemplary and explanatory and are intended to provide further explanation of the invention as claimed.

BRIEF DESCRIPTION OF THE DRAWINGS/FIGURES

The accompanying drawings, which are included to provide a further understanding of the invention and are incorporated in and constitute a part of this specification, illustrate embodiments of the invention and together with the description serve to explain the principles of the invention. In the drawings:

FIG. 20 illustrates the process of archive consolidation

FIG. 21 also illustrates the process of archive consolidation, but for a particular selected archive.

Figure 22:
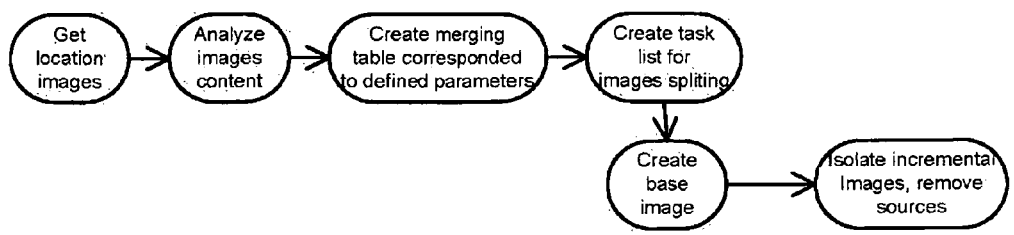

FIG. 22 illustrates how, given two archives, a single archive and two incremental archives can be generated.

Figure 23:
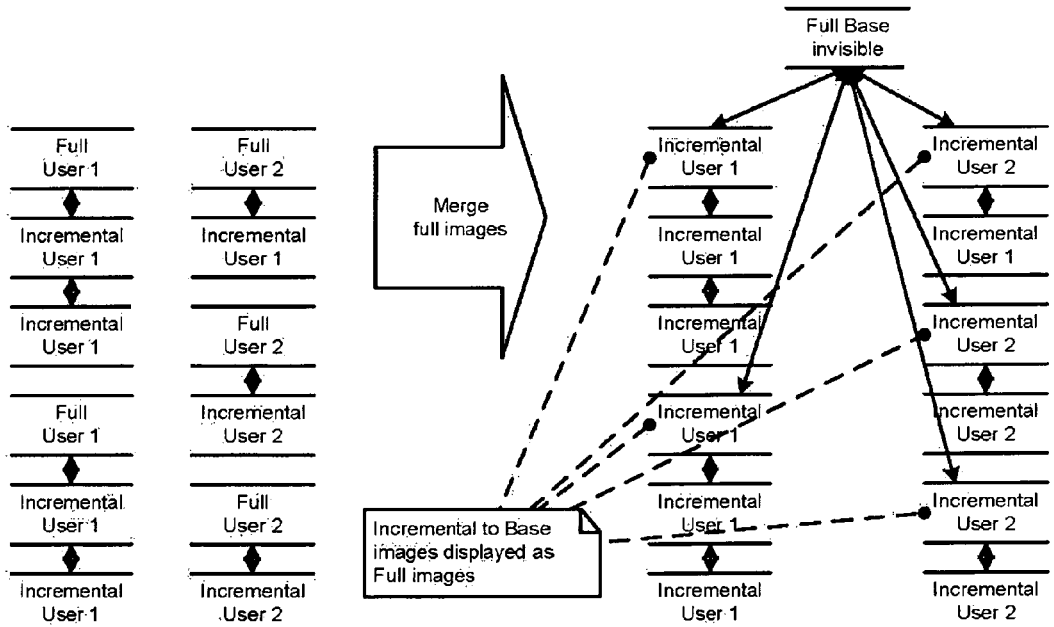

FIG. 23 is another representation of the process of FIG. 22.

Figure 24:
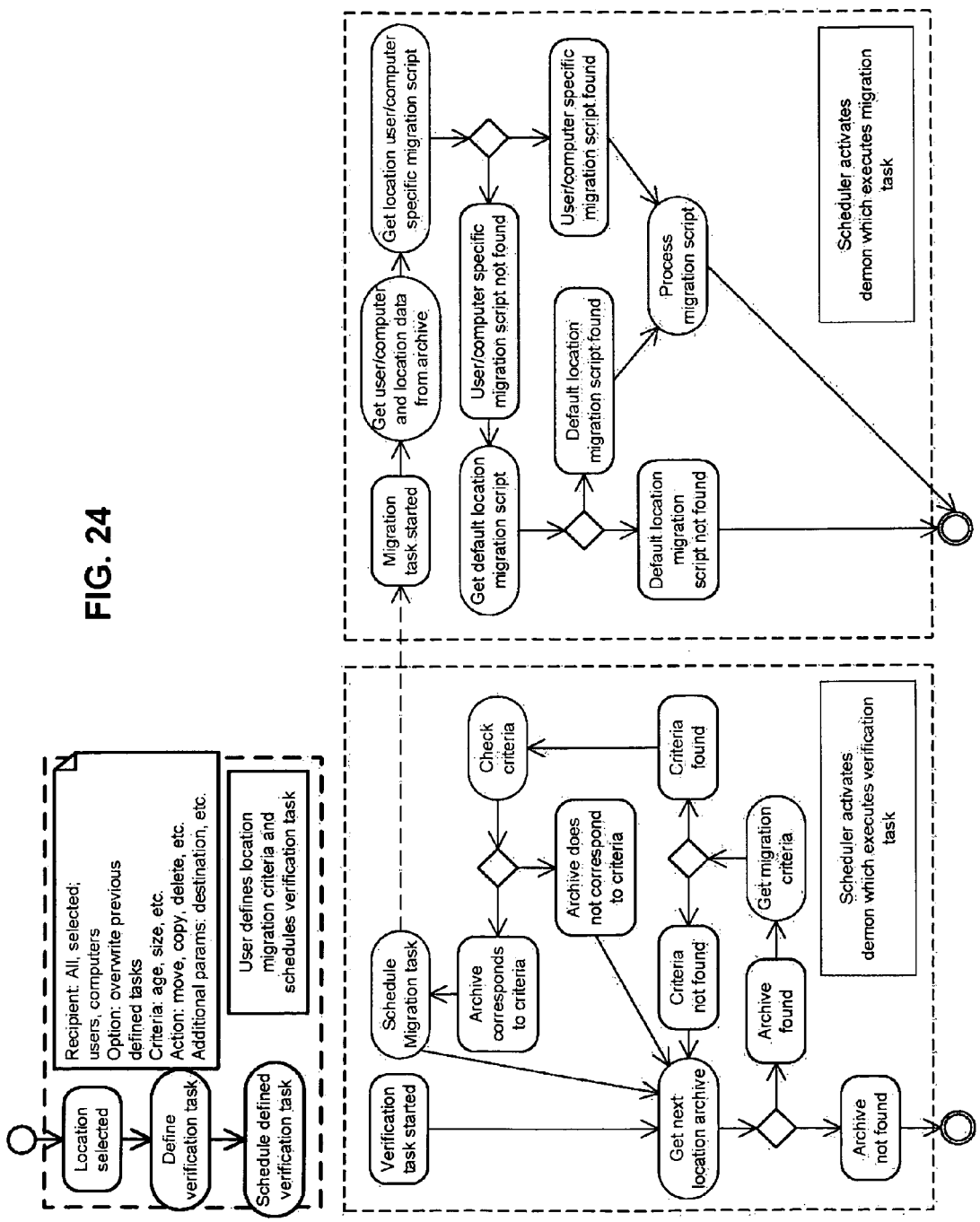

FIG. 24 illustrates the process of archive verification, and determination of whether the particular archive needs to be moved to a different location.

Figure 25:
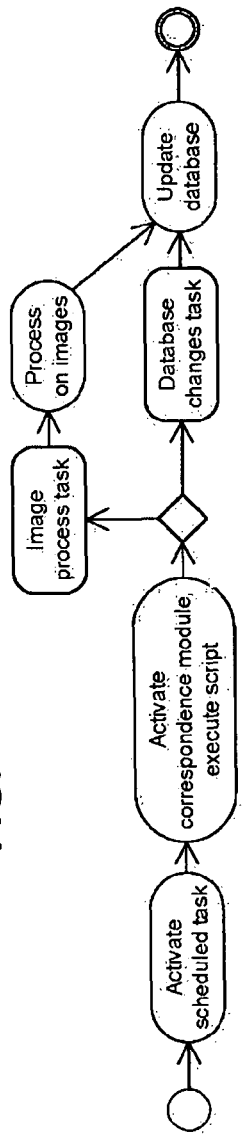

FIG. 25 illustrates the operation of a user console for managing the archiving.

Figure 26:
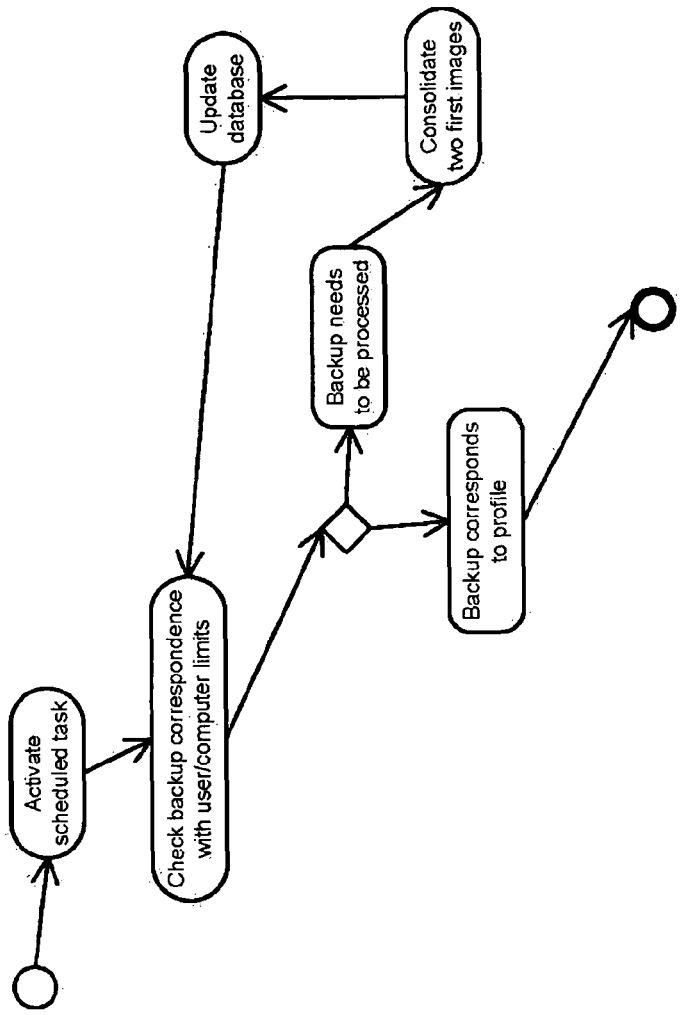

FIG. 26 illustrates the various tasks that are activated if the consolidation process is invoked.

Figure 27:
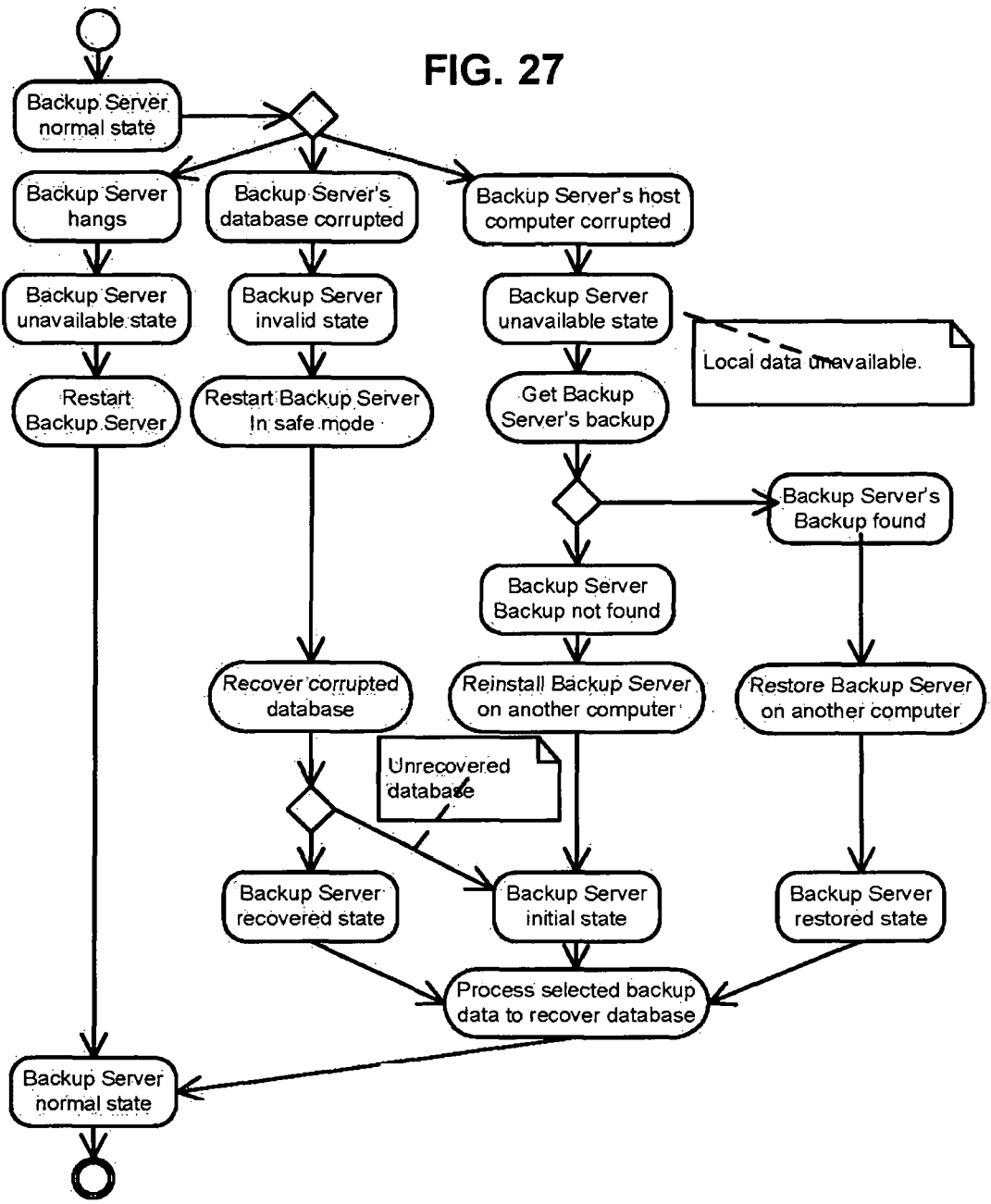

FIG. 27 describes the process of recovery of the backup server.

Figure 28:
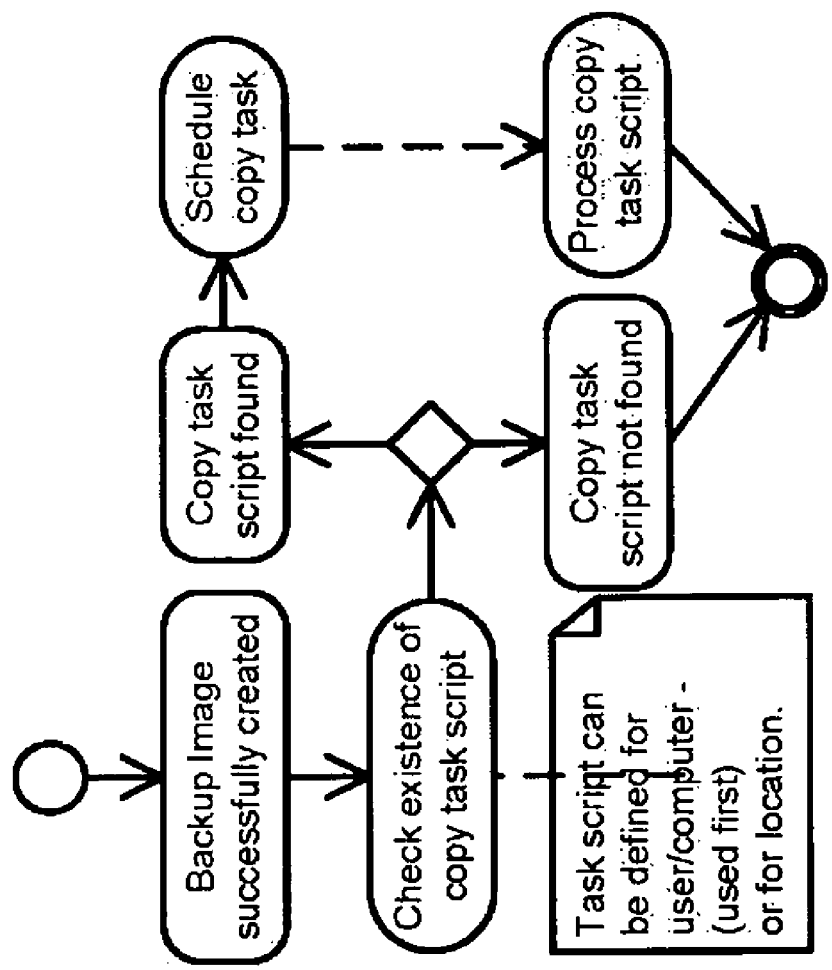

FIG. 28 illustrates a case where a copy of the archive might need to be created.

Figure 29:
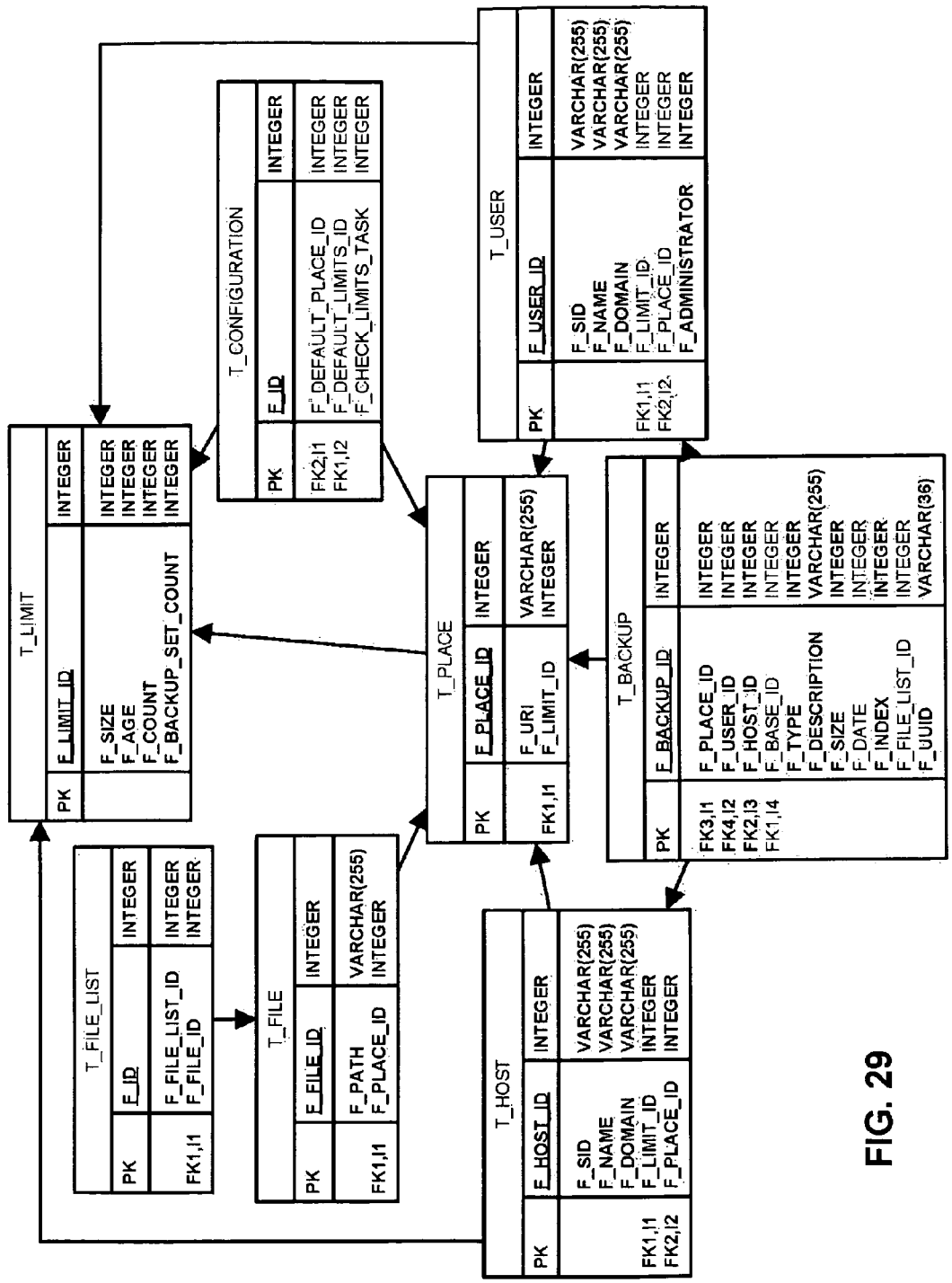

FIG. 29 is a table that illustrates how data, particularly service data of the backup server is organized.

Figure 30:
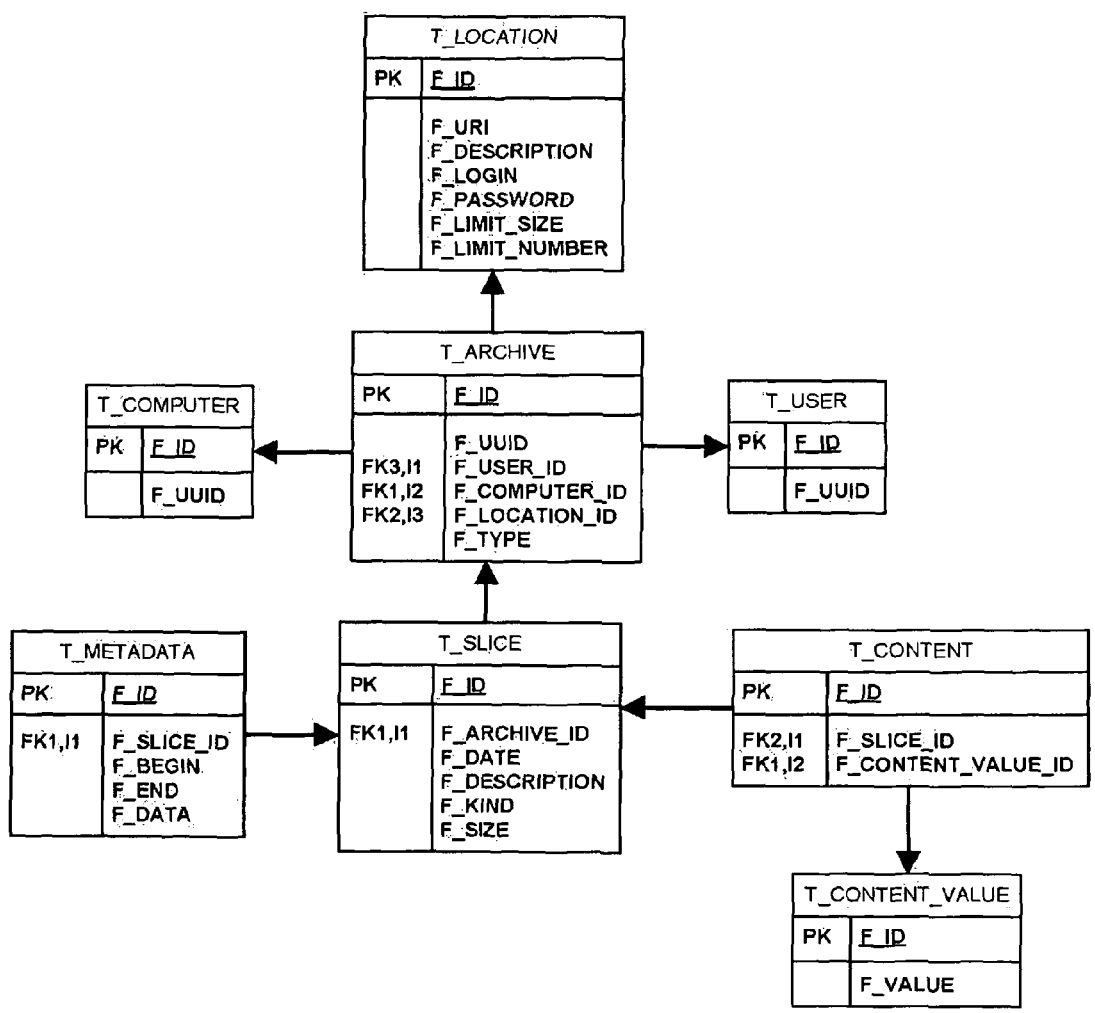

FIG. 30 is a table of archive-based data.

Figure 31:
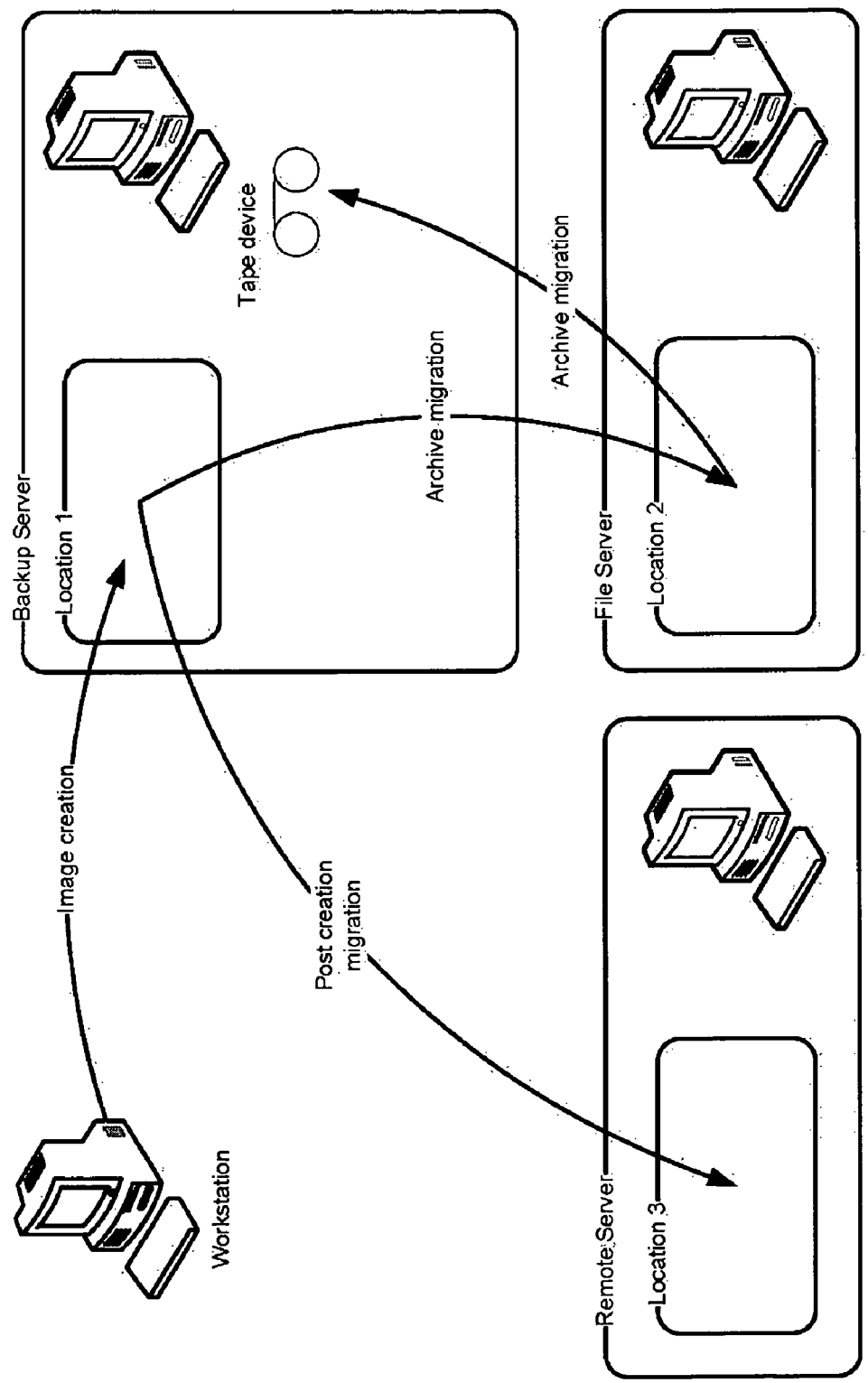

FIG. 31 illustrates interaction between various elements of the overall system.

Figure 32:
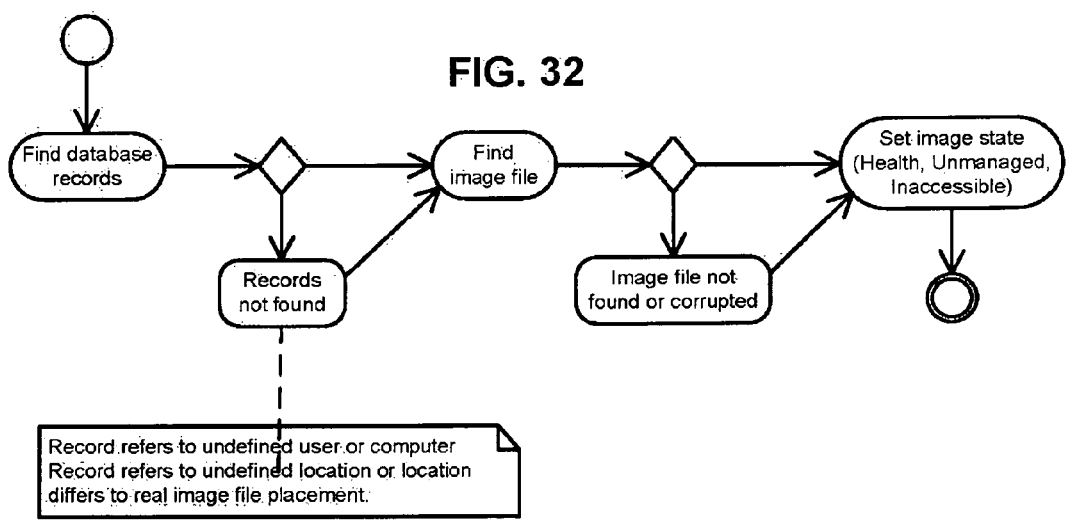

FIG. 32 is an illustration of how the system handles the "health" of the archives.

Figure 33:
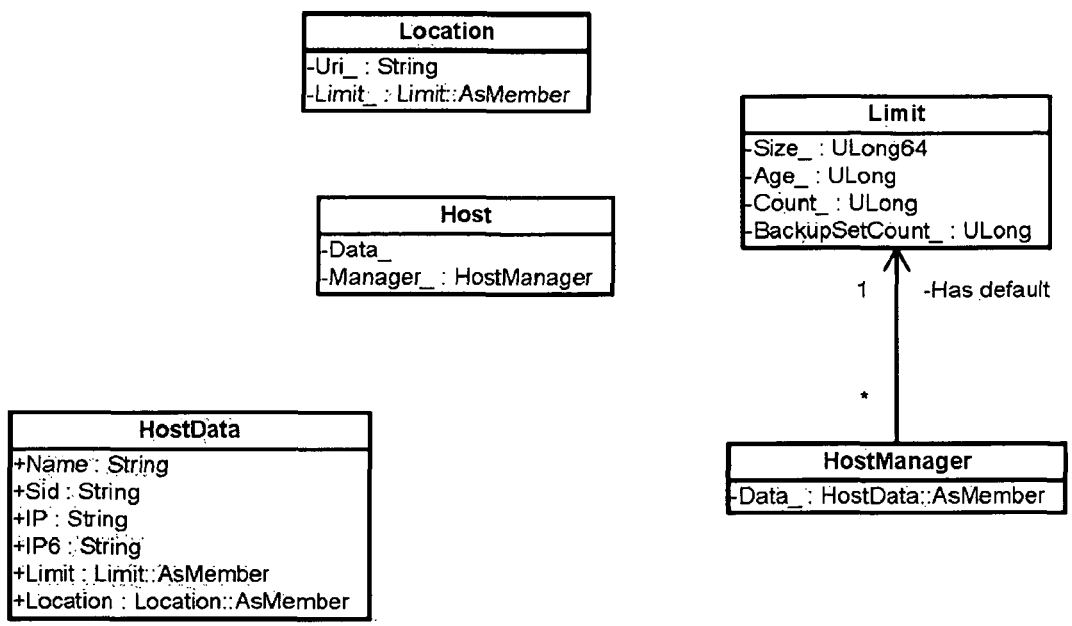

FIG. 33 illustrates some location-related service data, as it is kept in the backup server's database.

Figure 34:
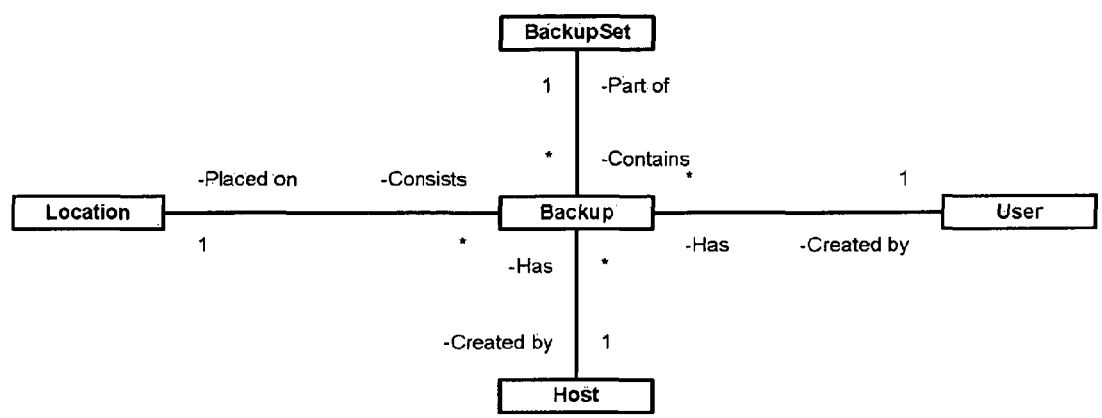

FIG. 34 is a schematic illustration of the interaction between the archives, users, and various computers involved in the system.

Figure 35:
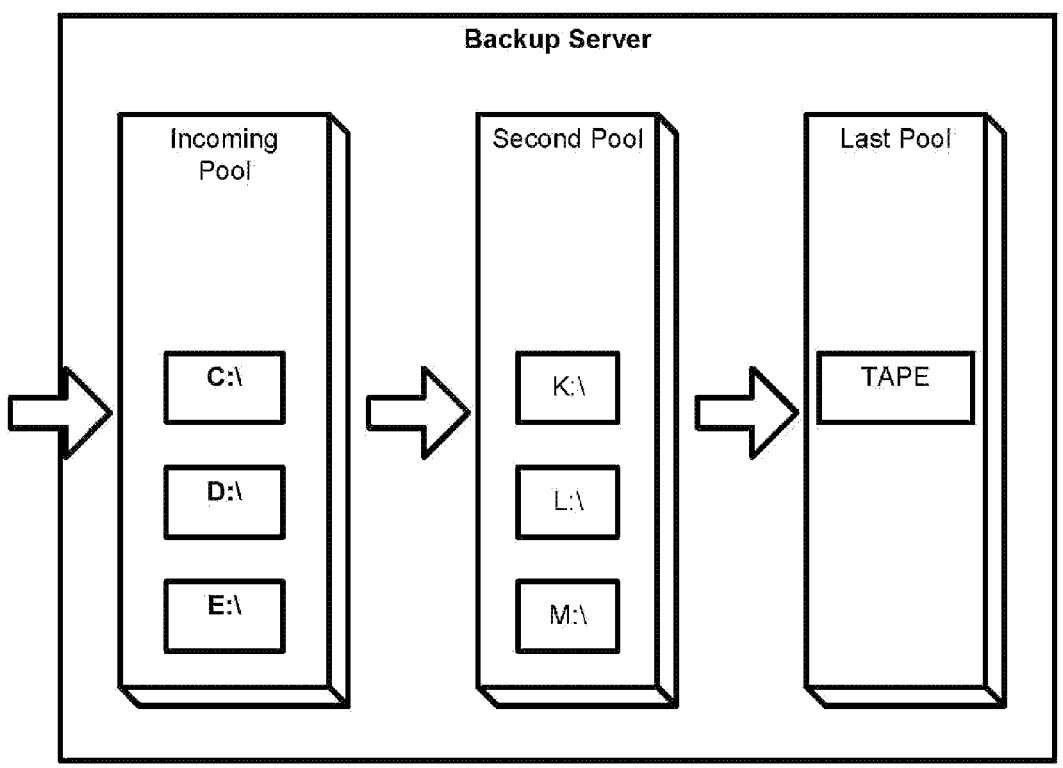

FIG. 35 shows an example how physical storages are organized within three pools.

Figure 36:
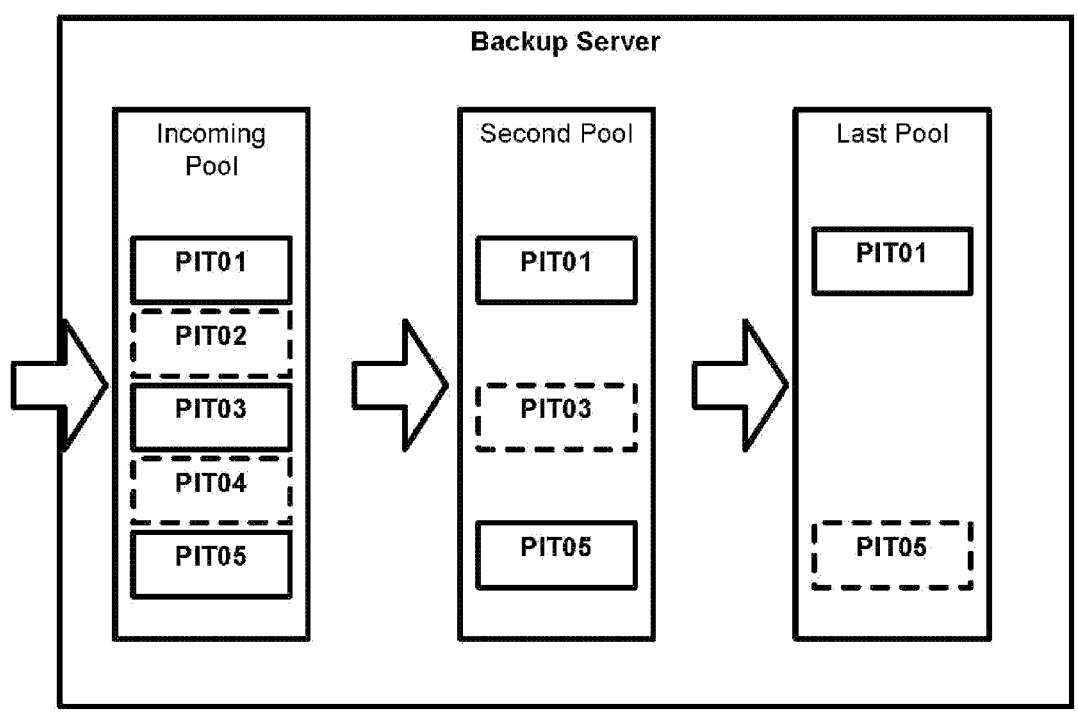

FIG. 36 illustrates how at some point in time, some of the restore points are designated.

Figure 37:
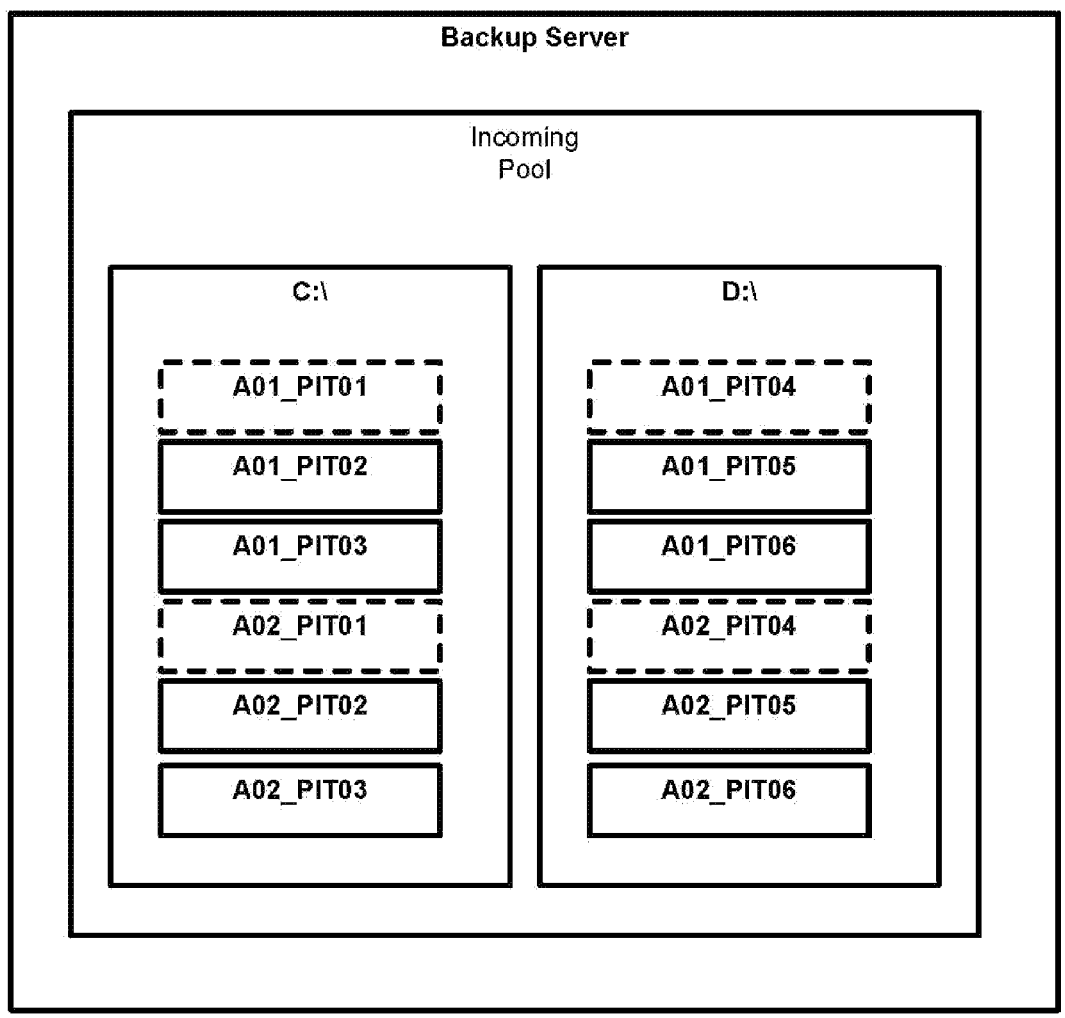

FIG. 37 shows the distribution of the restore point archives into locations.

Figure 38:
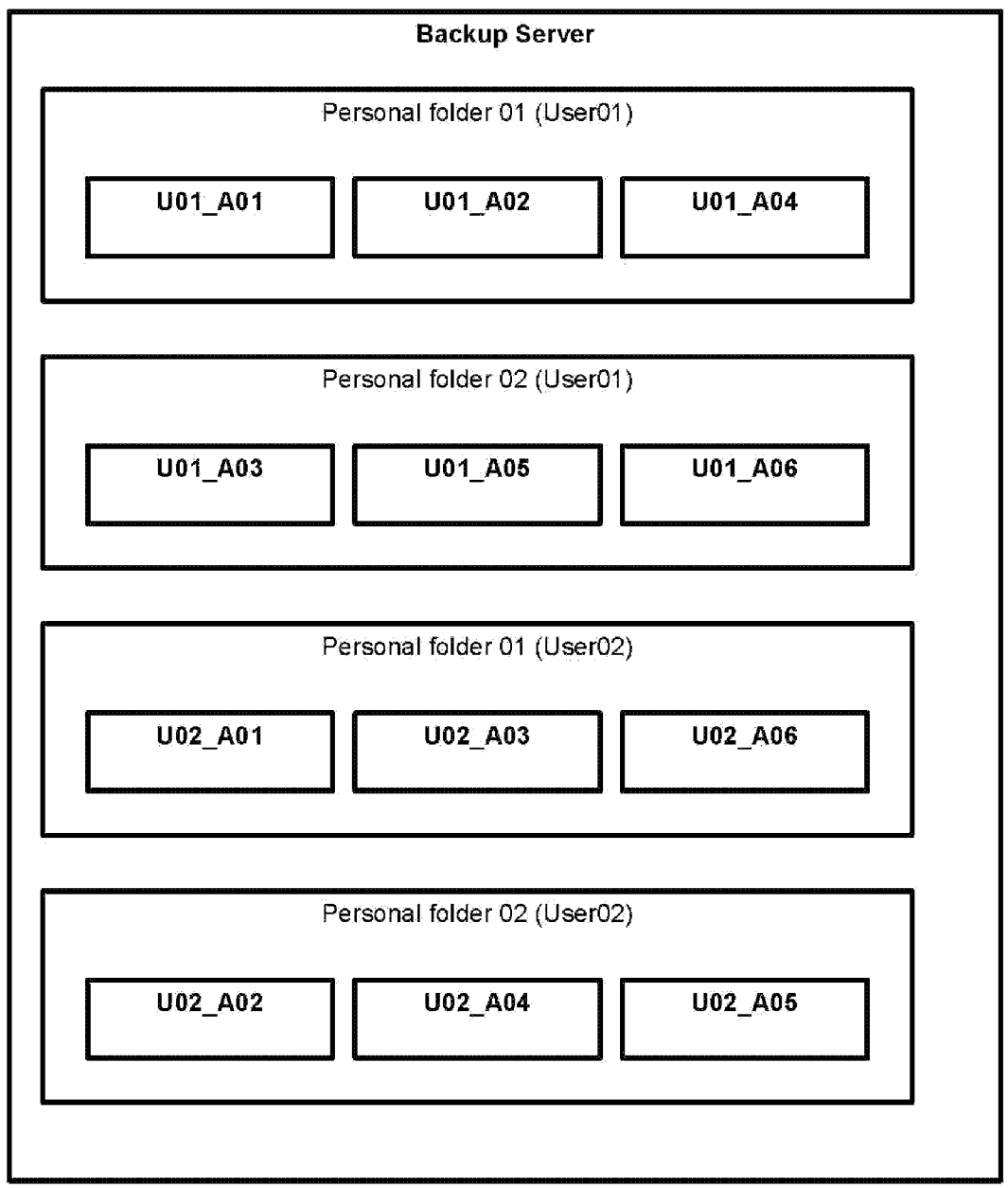

FIG. 38 illustrates how archives can be organized into personal folders, in this case, a logical distribution of the archives.

Figure 39:
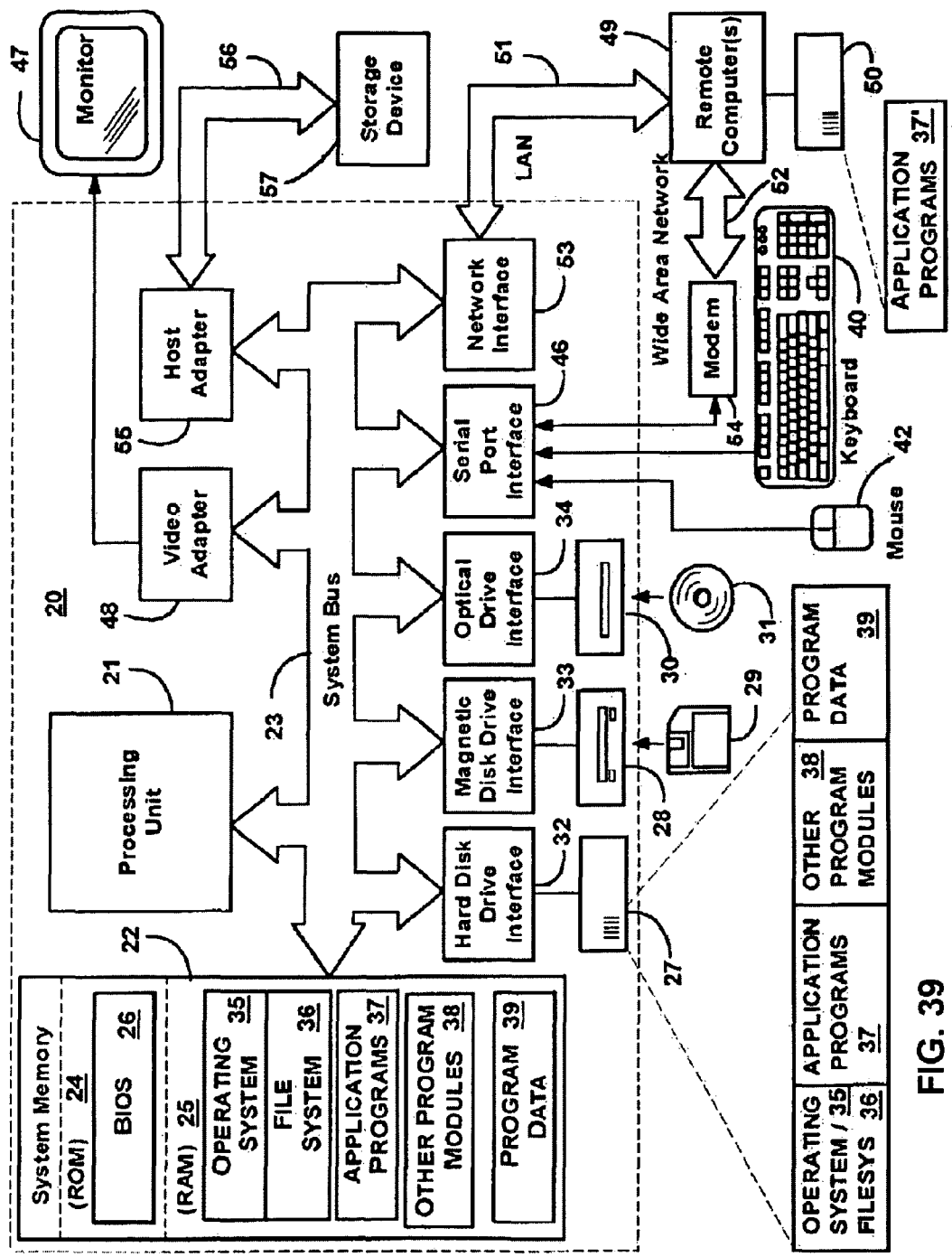

FIG. 39 illustrates an example of a computing system that may be used in the invention.

DETAILED DESCRIPTION OF THE INVENTION

Reference will now be made in detail to embodiments of the present invention, examples of which are illustrated in the accompanying drawings.

The purpose of the Backup Server is to organize a centralized storage and administration for reserve and backup copies for data of the various users and computers. The storage is organized into so called "locations," which are defined by the server administrator, with established limits on disk space for each location.

The locations are allocated to the users and the computers, for storage of backups (images). The users and the computers can define policies regarding limits, full or incremental backups, time and frequency of such backups, and so forth. As one optimization method for managing backups, different archives can be consolidated into a single archive, based on administrator's commands, or based on verification of archive profiles for various users and computers. Another type of optimization is combining different files, blocks, or sectors, where their contents are the same, into a single stored object or backup. This can be performed across different backups, across different archives, and, in some cases, across different locations.

The administration of the Backup Server is performed using a control console, where the administrator can manage location limits, user profiles, computer profiles, consolidate and combine backups and archives, etc. Administration can also be performed by various servers "appointed" by the system administrator, as well as, and administration can also be performed by a Group Server. A Group Server is a server that serves as the intermediary between users and the backup server. Thus, the backup server can concentrate on the actual operations involving data and backup of the data, while the Group Server exists to provide an interface to the users, to ensure that users trying to backup data, or otherwise access to backup server have the proper authorization, and so on. It will be appreciated that the Group Server and the backup server can be implemented as separate physical machines, one or the other or both can be implemented as virtual servers, or, in some cases, both servers can reside on the same physical machine, or the functionality of the Group Server can be incorporated into the backup server. However, for many practical applications, separating out the user interface, login, and authentication/authorization functions into a separate server is a more elegant technical solution.

Reliability and fault tolerance is achieved both by backing up the data of the Backup Server itself, as well as by providing mechanisms for recovery of data stored in the backups that belong to the users and computers.

A "location" is a local or network storage element. A location can contain files. A location can correspond to tape drives, tape libraries, disk drives, storage area networks, CD/DVD-ROMs, and so forth. A location can contain the data of full backups, incremental backups, or joined (consolidated) backups. Information regarding the relationship of the backups to each other (including the relationships of the files within the backups, or the files into which the backup is mapped) is contained in the database of the Backup Server, as well as in the metadata of the backups themselves, such as time of the backup creation, creator (or owner) of the backup, information about personal folders, allocation of backup, the identifier of the backup. A location typically has a limit on the size allocated to it, as well as on the time during which backups remains stored. This limit is also stored in the Backup Server's database.

The location limits, such as limits for the maximum number of backups in a location and in an archive, are defined. The locations have a path. Also, a login and a password can be used for security of working with the data on the location. The path, login and password are stored in the Backup Server's database. A location can be represented by several different physical and/or virtual storage devices, which permits dynamically increasing the storage space available for storing archives, without changing the configuration of the users and computers.

Figure 1:
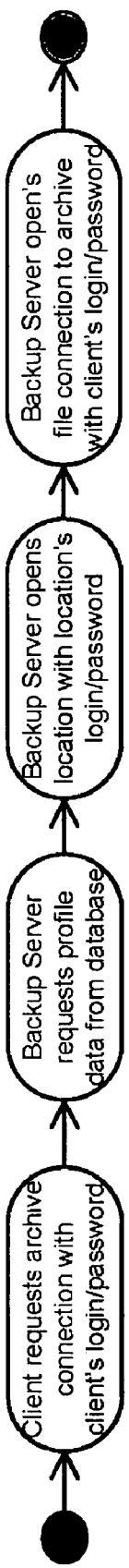
FIG. 1 illustrates a process of the client connection to archive based on profile data stored on the backup server.
Figure 2:
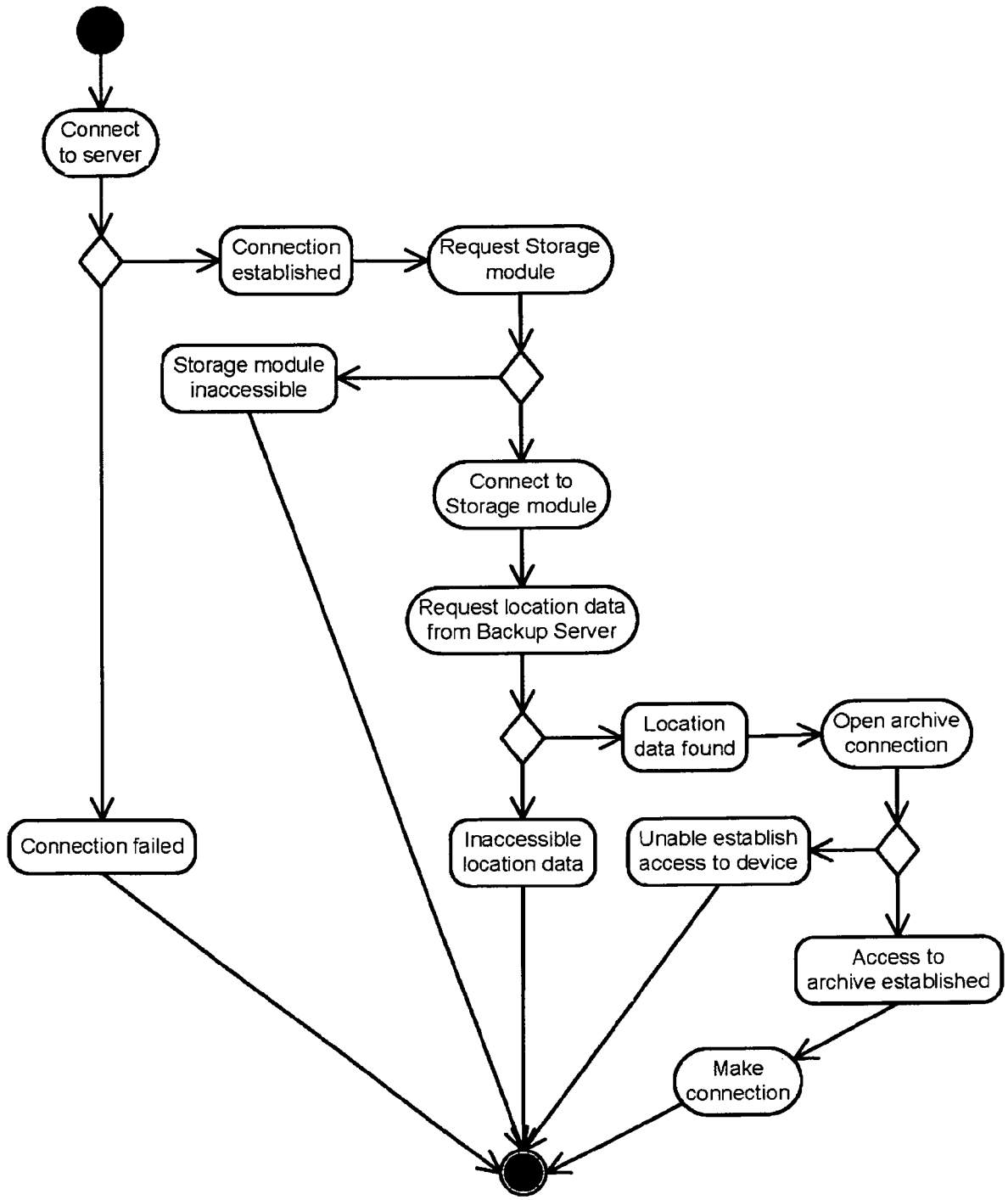
FIG. 2 is a diagram showing a general procedure of the process of the client connection to an archive.
Figure 3:
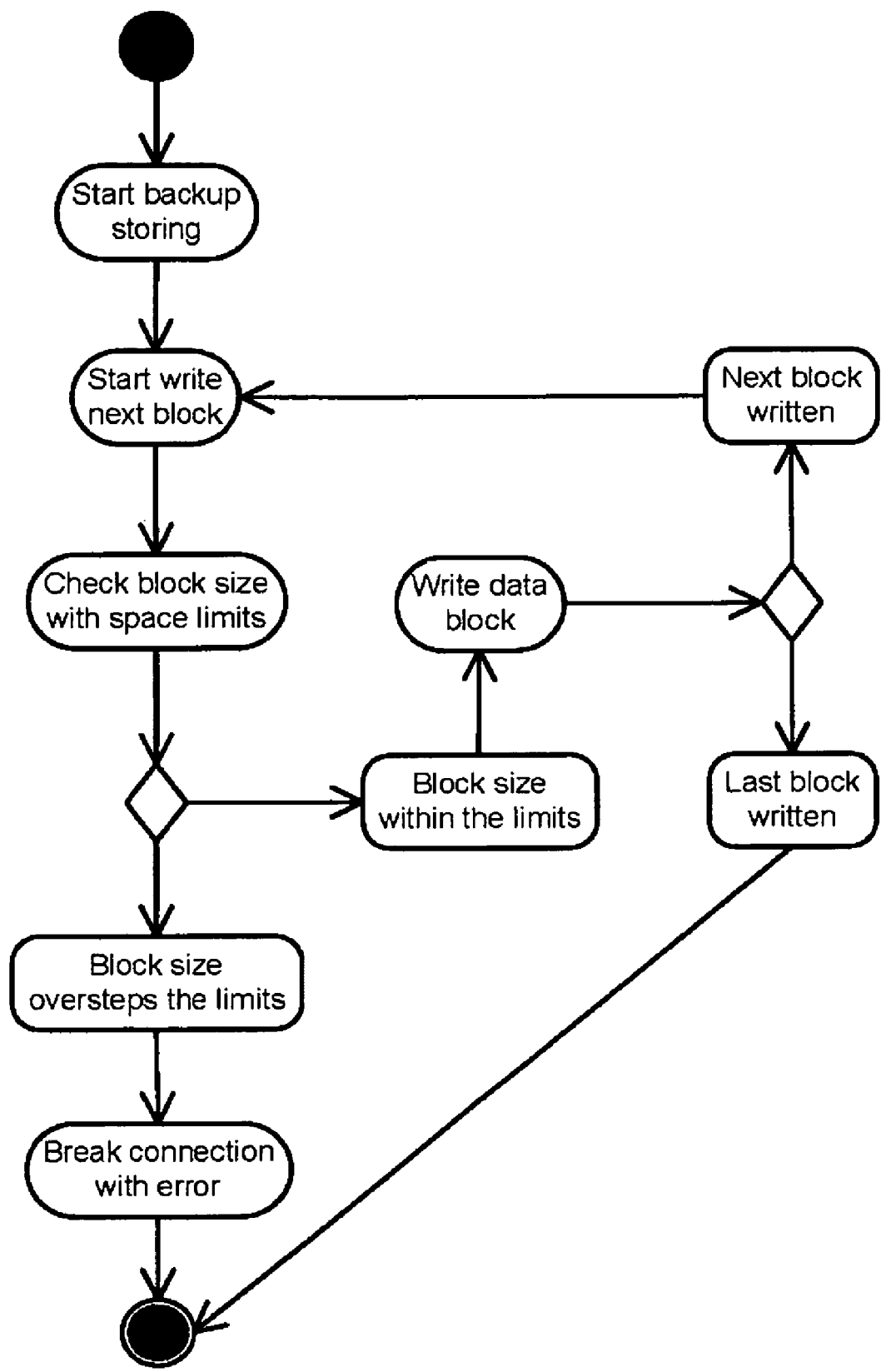
FIG. 3 illustrates how the limits are checked during backup creation.
Figure 4:
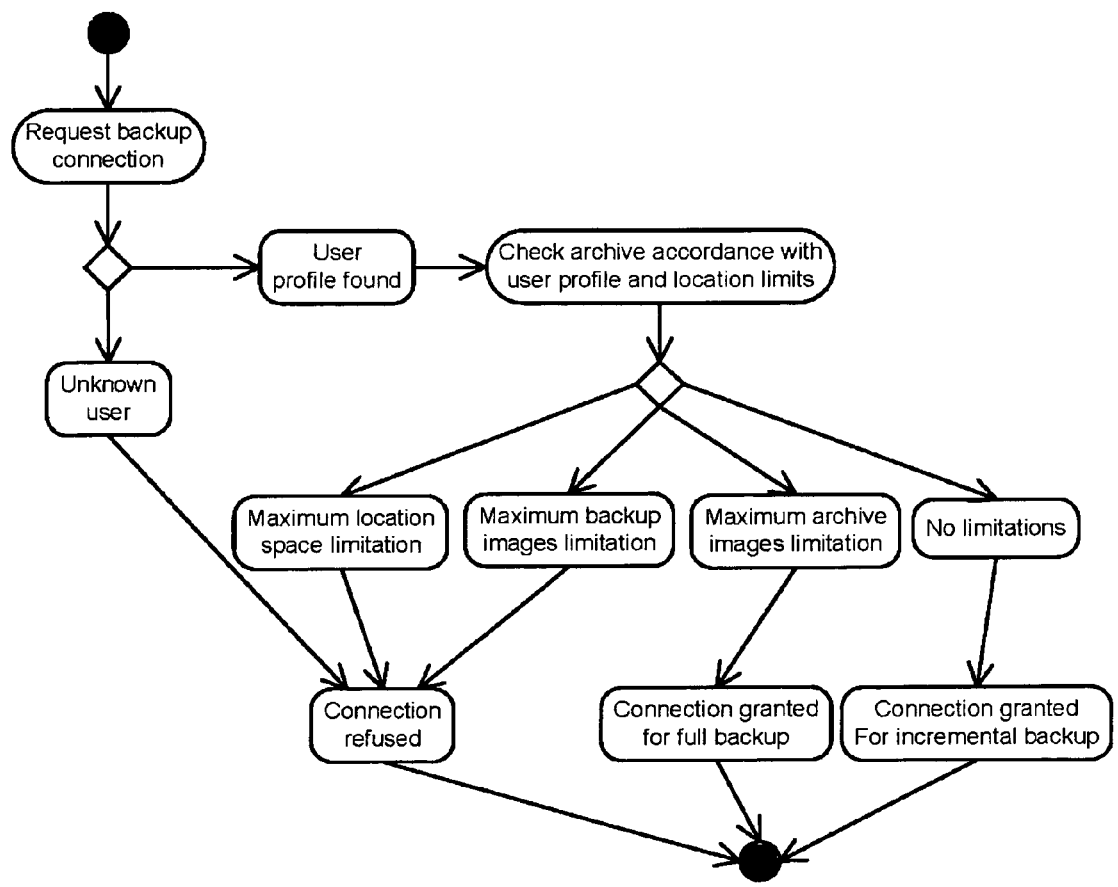
FIG. 4 illustrates a process of the client connection to archive with a limit verification.

FIG. 1 illustrates a process of the client connection to archive based on profile data stored on the backup server. In this embodiment, the client is a part of client-server architecture. FIG. 2 is a diagram showing a general procedure of the process of the client connection to an archive. FIG. 3 illustrates how the limits are checked during the process of a backup creation. FIG. 4 illustrates a process of the client connection to archive with a limit verification. A user and/or a computer have identifiers that the Backup Server uses in order to enforce the policies on management and administration of the archives. The data is stored in the Backup Server's database. Locations are defined for the users and the computers, where the corresponding backups will be stored, and limits for the maximum number of backups in a location and in an archive are defined. Based on the Backup Server's behavior is defined by the limits when a file channel is allocated for creation of an backup.

Figure 5:
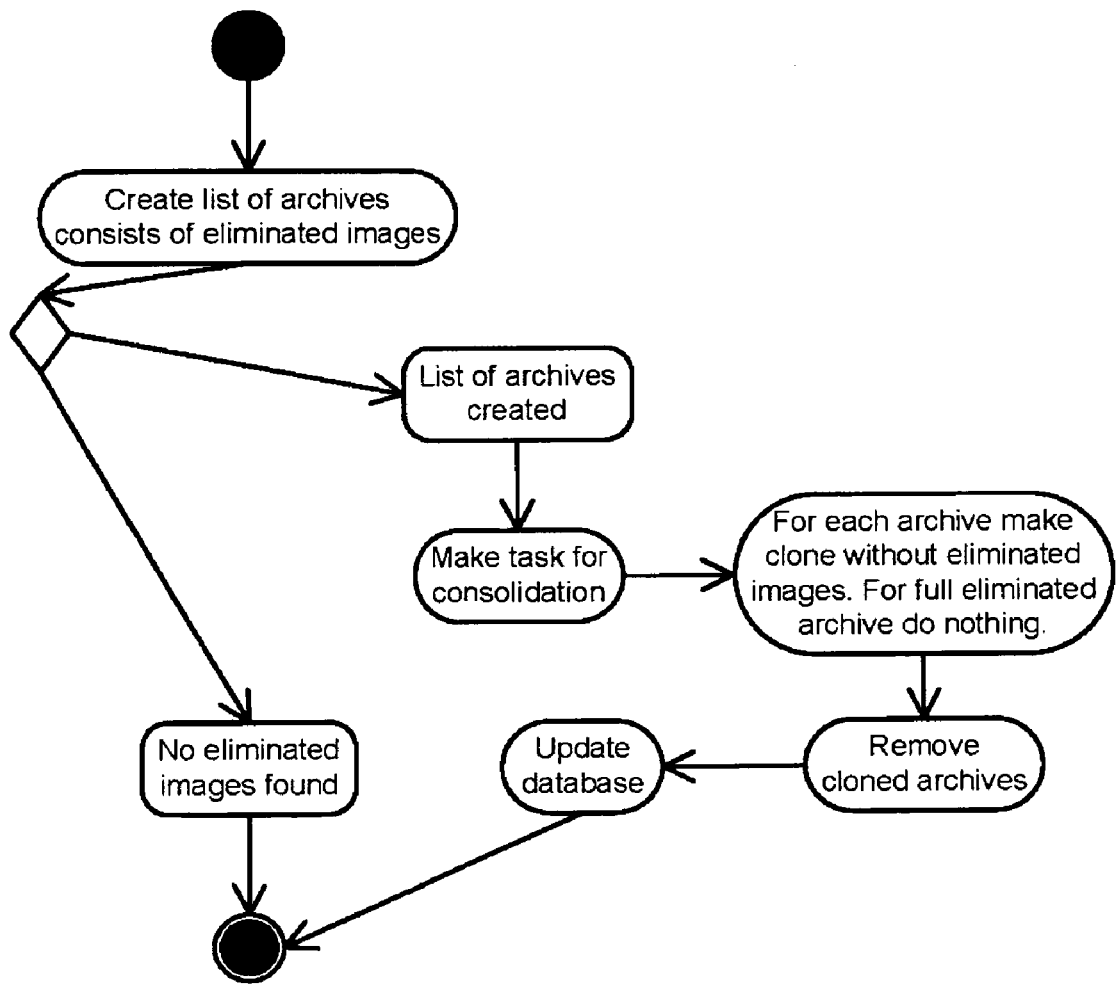
FIG. 5 illustrates the process of consolidation for a selected backup.

FIG. 5 illustrates the process of consolidation for a selected backup. Consolidation here refers to a process of combining two (or more) adjacent backups in an archive into a single backup, for example, combining a selected backup with the preceding one. As one particular example, consolidation can involve creating, from an archive that contains a preceding backup, a backup clone that is stored in a different archive, which previously did not contain that backup. In this case, when the archive's clone is based on two successive backups, in reality, what happens is the following: if the excluded backup is the last backup in the archive, then that backup is removed. Otherwise, its data is combined with a subsequent backup. The source archive can then be removed or deleted.

Figure 6:
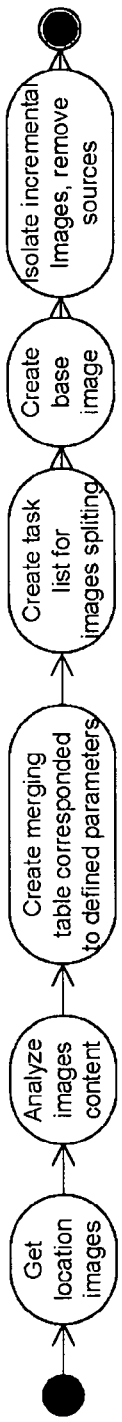
FIG. 6 illustrates a combination of backups based on their overlap.
Figure 7:
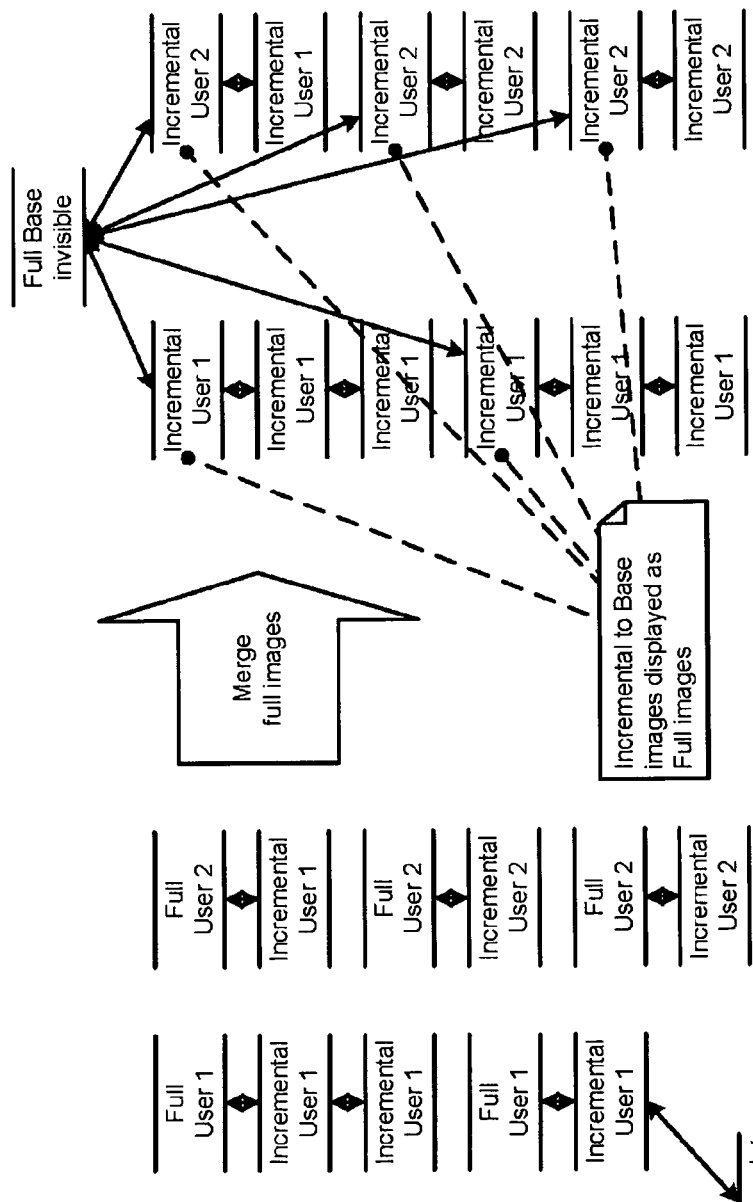
FIG. 7 illustrates the relationship between the backups before and after the consolidation of the backups.

FIG. 6 illustrates a combination of backups based on their overlap, and FIG. 7 illustrates the relationship between the backups before and after the consolidation of the backups. Based on analysis of the contents of several backups, a common portion between the backups can be identified. This common portion can be treated as a base backup, while the differing portions can be treated as the increments to the base backup. Note that the base backup need not necessarily represent a restore point.

The administrator's console permits the administrator to perform a number of tasks. For example, the administrator's console permits configuration of the parameters of the users and the computers, to add computers, to define limits for the computers, to remove backups of a selected computer, to remove a computer from the list and remove or delete all of its backups.

The administrator's console also permits configuration of user parameters, adding computers or users to the database, defining limits for them, removing or deleting backups for selected users and/or computers, and removing selected computers and users from the list, together will all their backups.

The administrator's console also permits configuration of location parameters: setting of limits (for example, limits for a selected location), moving old backups of a selected location to a different location, removing or deleting all backups of the selected location, deleting the selected location, changing the contents of the selected location (adding or deleting folders and real or virtual disk drives), optimizing backup storage by combining different backups, removal of all backups from the location, and deletion of the location and all of its backups.

The administrator's console also permits management of backups stored on the Backup Server: consolidation of a selected backup with a previous one or with a different backup of the same user or computer, verifying integrity of the backups, consolidation of a sequence of backups or of all the backups of an archive, transferring or moving a select archive and/or group of archives to a different location, removing or deleting all or some selected backups.

The administrator's console also permits configuration of parameters that are normally set by default: defining a default location and the locations limit, defining limits for users and computers by default, defining backup schedule by default, defining data integrity verification schedule for locations, users, archives, and so forth, and turning off automatic optimization.

Figure 8:
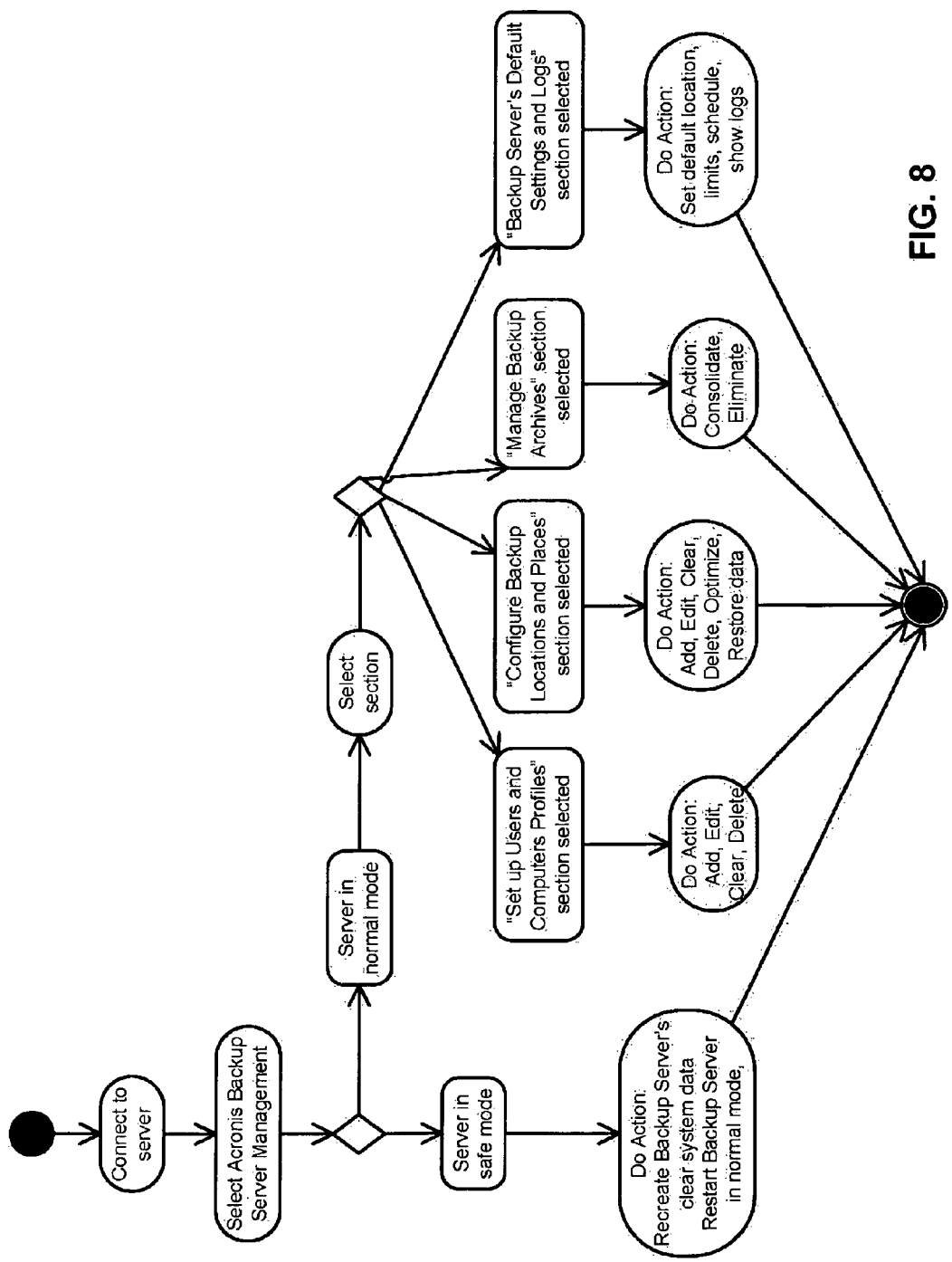
FIG. 8 illustrates the management of the Backup Server by using the administrator's console.

FIG. 8 illustrates the management of the Backup Server by using the administrator's console.

Figure 9:
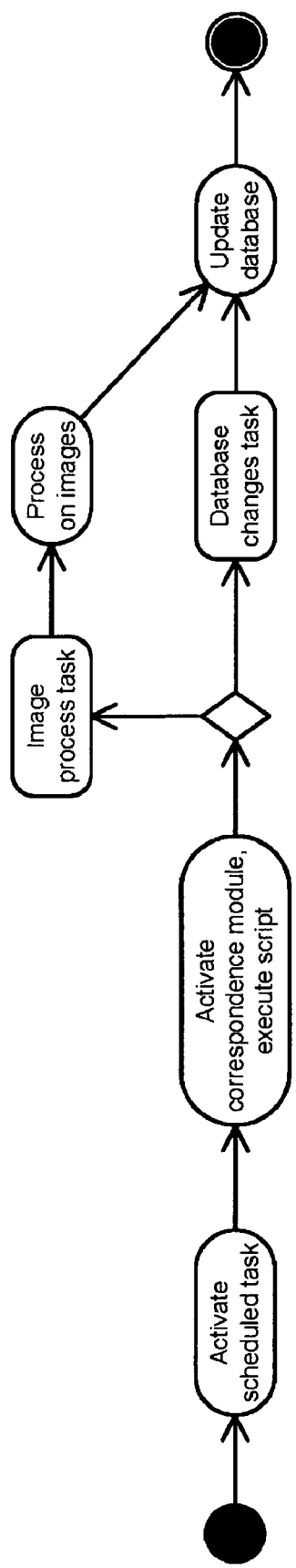
FIG. 9 illustrates automatic processing of backups.

FIG. 9 illustrates automatic processing of backups. Based on a preset schedule, the Backup Server verifies the integrity of the archives for particular users or computers, verifies the limits for that user and/or computer and so forth. If the limits have been exceeded, the oldest backups are consolidated, until the overall amount of storage data for the user no longer exceeds the limit. Also, based on a preset schedule, such tasks as copying, backup, migration to another location or drive, or backup optimization can be performed. These tasks can be set either through the Backup Server console, through the Group Server. Through the Backup Server interface, etc. The tasks for the Backup Server can be set by the Group Server, including the task to change the list of computers or users.

Figure 10:
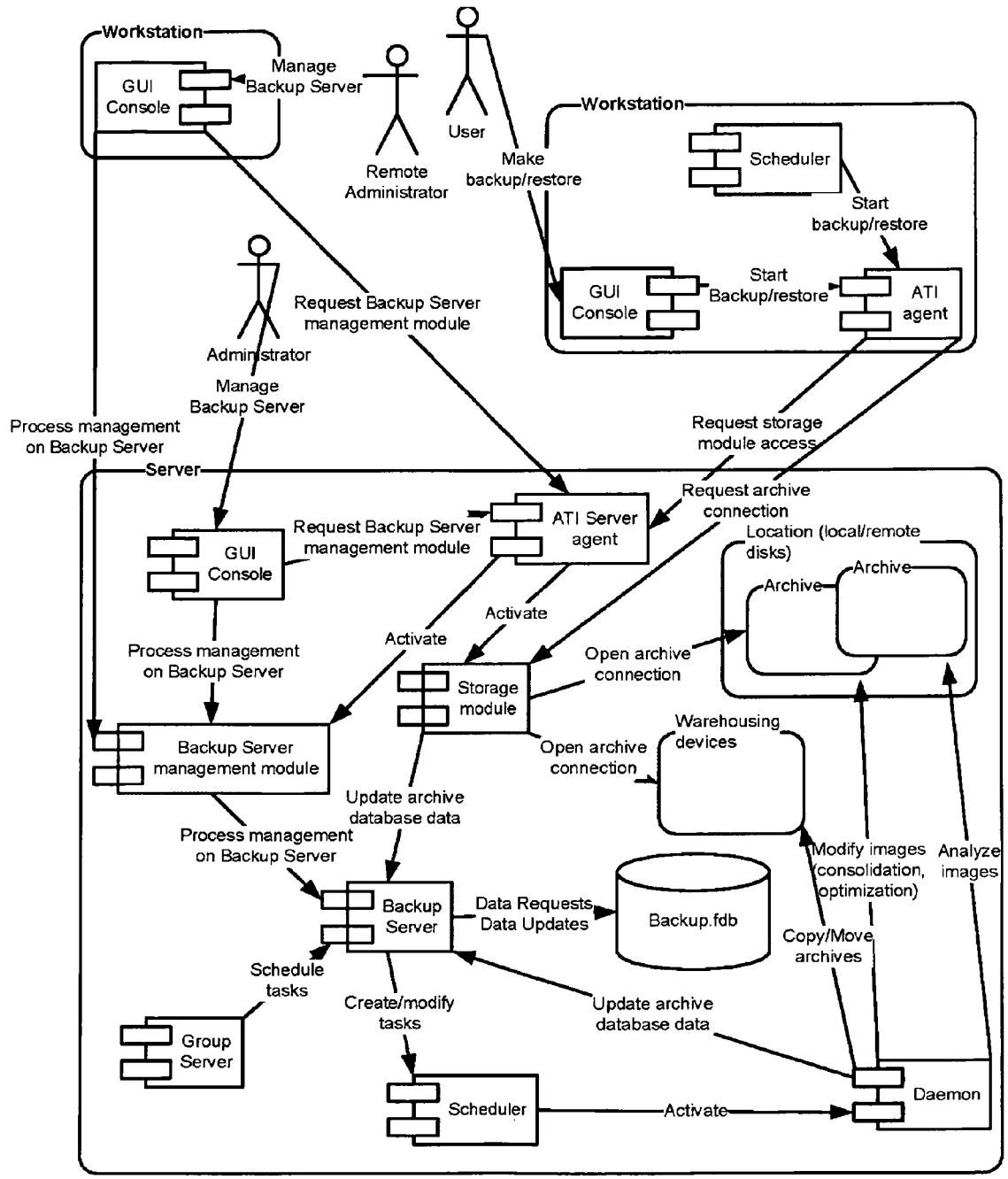
FIG. 10 illustrates an overall diagram, showing the various elements and actors, as they relate to the Backup Server.

FIG. 10 illustrates an overall diagram, showing the various elements and actors, as they relate to the Backup Server.

Figure 11:
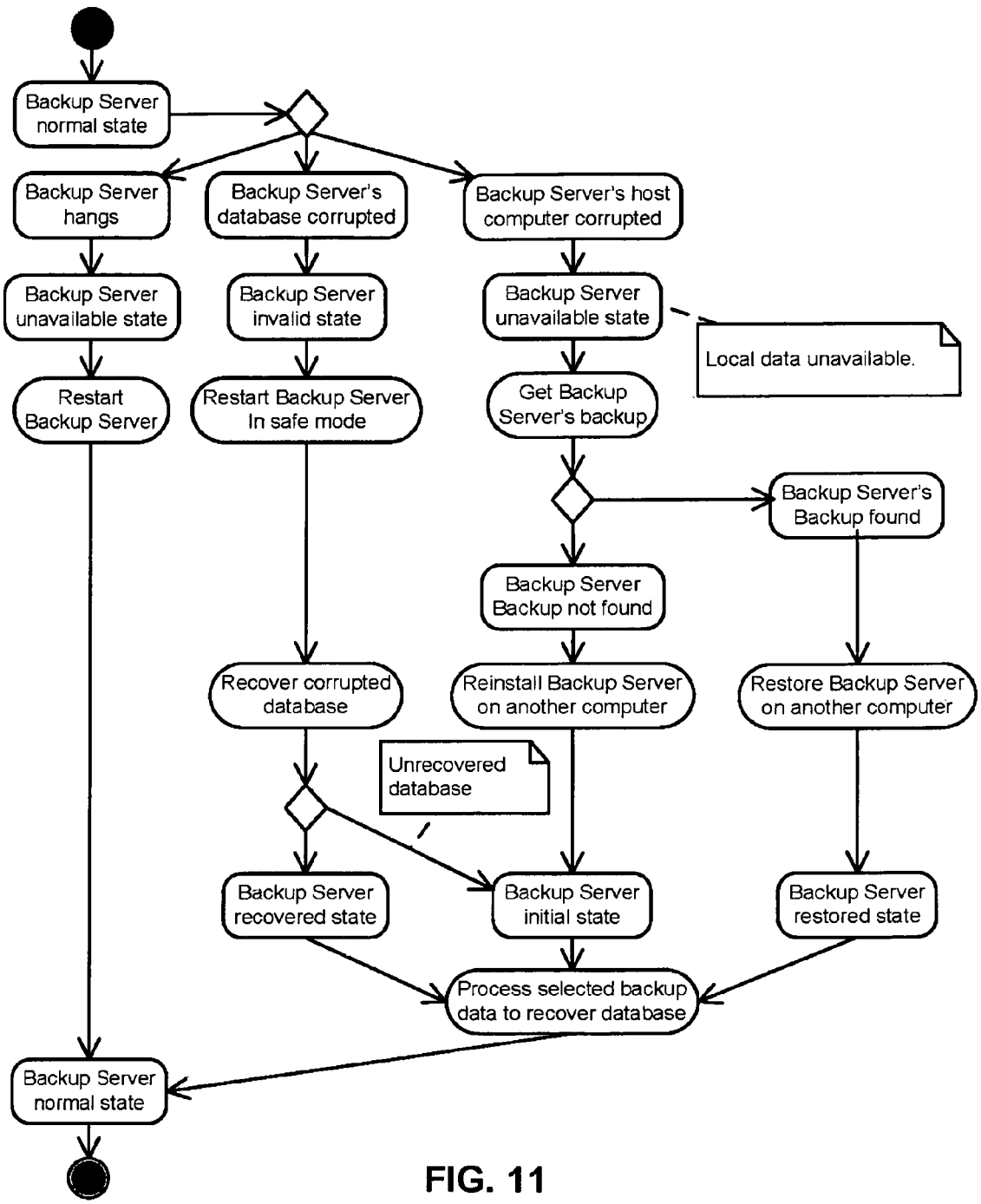
FIG. 11 illustrates the handling of certain exceptional circumstances.

FIG. 11 illustrates the handling of certain exceptional circumstances, such as Backup Server hanging, Backup Server's database corrupted, Backup Server's host computer corrupted with recovering corrupted Backup Server database from the metadata, which was backed up (copied) with the backups of other servers (computers) connected to the Backup Server.

The table below represents the structure of the database of the Backup Server.

Figure 12:
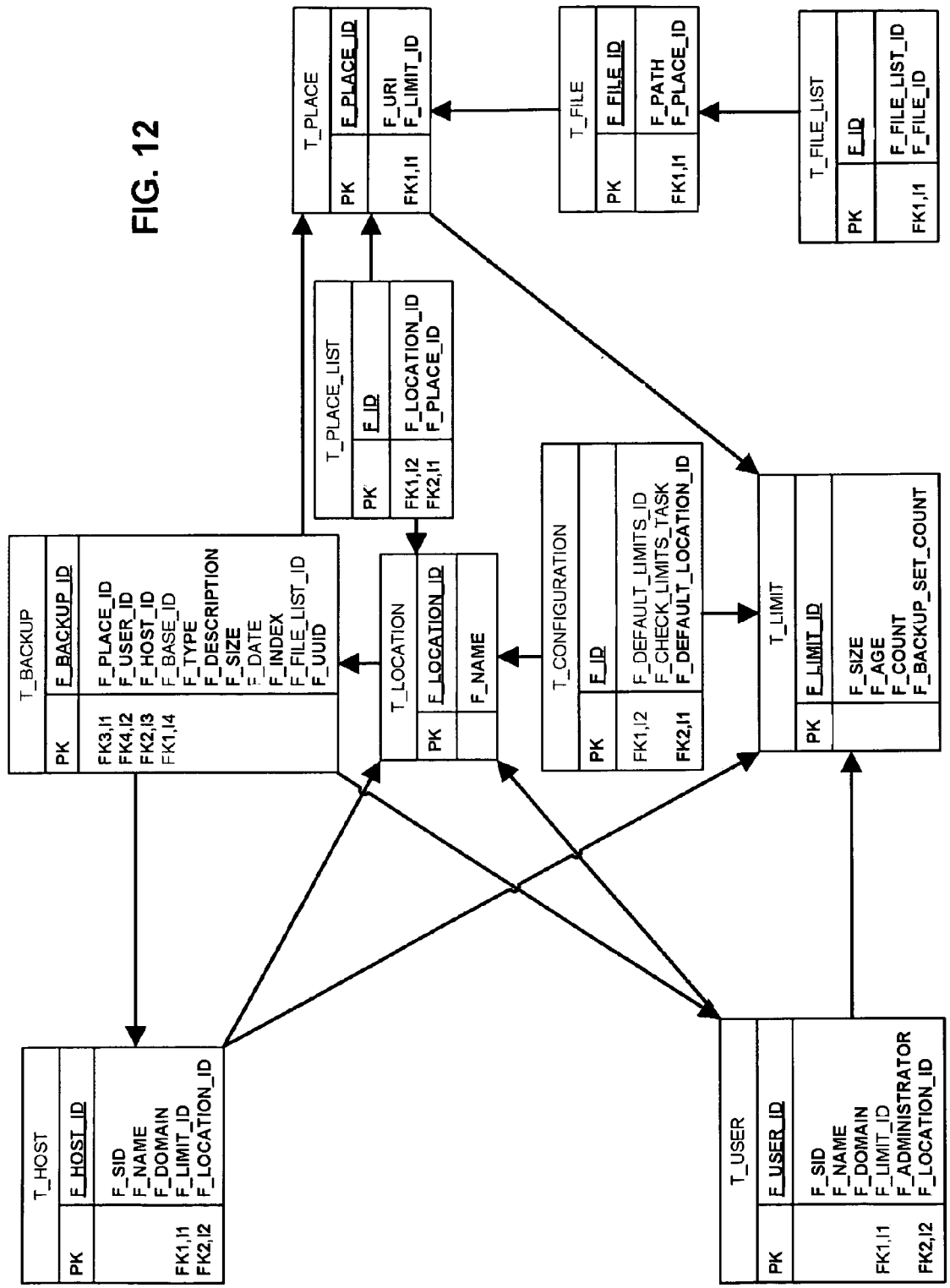
FIG. 12 illustrates the archive and location parts of structure of the database of the Backup Server.

FIG. 12 illustrates the archive and location parts of structure of the database of the Backup Server, also described by the following table:

| Table | Purpose |
| --- | --- |
| T_BACKUP | Data regarding backups that have been created and their link to the tables of locations, users and hosts, also backlink to itself as base backup. |
| T_PLACE | Data regarding location: path to location and link to limits information |
| T_HOST, T_USER | Data regarding computers and users, links to locations, tables of uses has a field that defines administrative rights |
| T_LIMIT | Limits for the user or computer or location, or default limits |
| T_CONFIGURATION | Default settings and identifier of a task for verifying compliance with the limits |
| T_FILE | Data regarding backup file and its link to location and its physical position on the resource (disk) |
| T_FILE_LIST | Links to create a list of files of the backup |
| T_LOCATION | Location name and identifier |
| T_LOCATION_LIST | Links to generate a list of locations |

The metadata can be represented in XML format, for example, as follows:

<backup-metadata>
   <Sliceindex>0</Sliceindex>
   <archiveId>75612</archiveId>
   <archiveType>0</archiveType>
   <personalFolderId>31612</personalFolderId>
   <sliceCreationDate>8109406</sliceCreationDate>
   <encodingKeyId>37895</encodingKeyId>
   <userName>TestZone\AlexTest</userName>
   <computerName>TestZone\FirstStation</computerName>

The metadata of the backup is written with the backup and can be copied to the database as a record relating to the backup. The database record with the backup metadata is used during the recovery process from the backup. The metadata recorded with the backup also can be used during recovery process if record with metadata for this backup is inaccessible or corrupted.

When the backup is created, various circumstances can occur, such that the data on the Backup Server will be incomplete. In order to ensure the correctness of the data, it is necessary to provide for a possibility of a rollback of the metadata and backup files to an earlier point in time. An exception to this is the case where the backup was fully created, but the appropriate data was not written to the database. In this case, the Backup Server will register a mistake in its logs, but the metadata and backup files will not be removed. During the next integrity verification, the metadata data will be added to the database.

Figure 13:
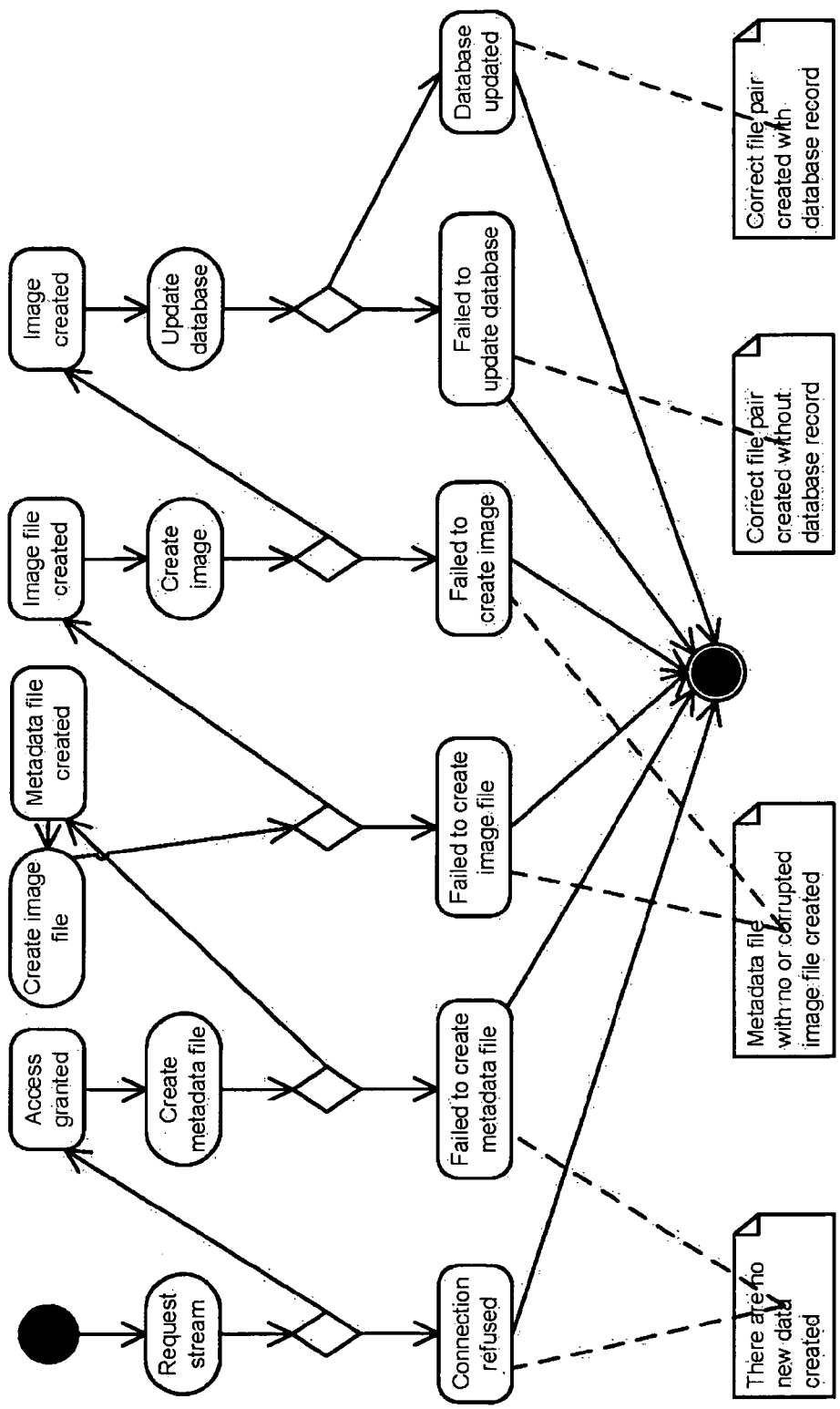
FIG. 13 illustrates the process of creating the backup and the metadata file.

FIG. 13 illustrates the process of creating the backup and the metadata file.

Once the Backup Server receives the right to create the backup, but just before creating the backup file, the Backup Server creates a file with the metadata, using the command Backup::CreateMFData( ). If the backup creation is not successfully completed, the Backup Server removes the backup file and the metadata using the command Backup::Rollback( ). In the case of failure when writing to the database, the backup and the metadata remain, and an error entry is added to the log. Note that the access by the user or a computer that was the source for the backup might not be permitted, following the policy described below, for how the Backup Server deals with verifying data integrity.

In addition to metadata of backups, special metadata store data regarding locations, which can subsequently be restored. This data, by default, includes restrictions on the locations and migration parameters. These files are created when the location is created, and are updated together with renewal of the location parameters.

The metadata can be represented as follows in XML format:

<location-metadata>
      <description>"First department. Intermediate location."</description>
      <limit>
         <size>2199023255552</size>
         <count>100</count>
      </limit>
   </location-metadata>

When a new location is added, such that the location contains metadata, the data from the metadata can be automatically added to the database.

Figure 14:
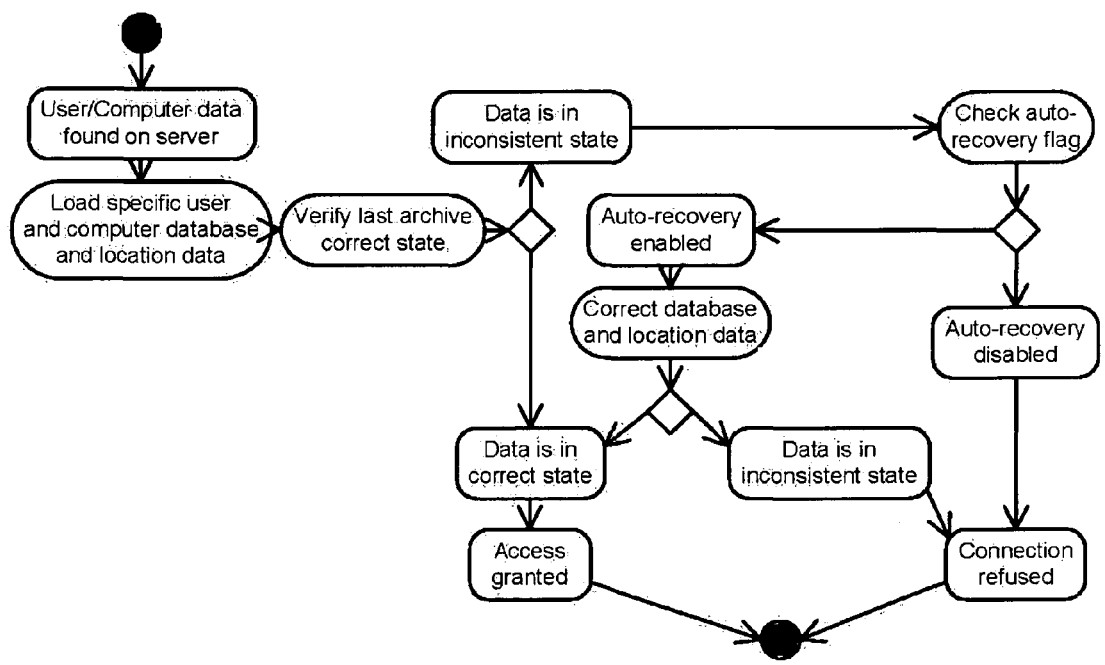
FIG. 14 illustrates a diagram of data integrity verification prior to creation of the backup.

FIG. 14 illustrates a diagram of data integrity verification prior to creation of the backup. Note that prior to backup creation, the Backup Server needs to verify data integrity both on the Backup Server itself, as well as in the archive into which the data for this particular computer or user will be copied. Some errors can be corrected automatically, based on the settings of the Backup Server. All other situations where errors are detected lead to an access error for purposes of backup creation.

The Backup Server will generate a log regarding an incorrect state of the archive and about operations that lead to the automatic error correction. Data integrity verification at the stage of backup creation is done only for the latest archive that is created by the particular user or computer.

In addition to data integrity verification prior to backup creation, the administrator can also perform data integrity operations, both manually and at preset time intervals. The data integrity verification relies on location data, and is performed separately for each location. Within each location, the data from the database, as well as the metadata, is loaded. For each location, the data from the database, as well as the metadata, are loaded. During the loading of the metadata using the command Backup::LoadMFData( ), a check is performed of the log regarding the users and the computers being backed up, as well as an integrity check of the backups in the archive, using the command Backup::VerifyDBData( ). Further actions depend on the state of each backup. After verifying the integrity of the data in the location, the data in the database is checked using the command Backup::LoadDBData( ), and Backup::VerifyMFData( ).

Figure 15:
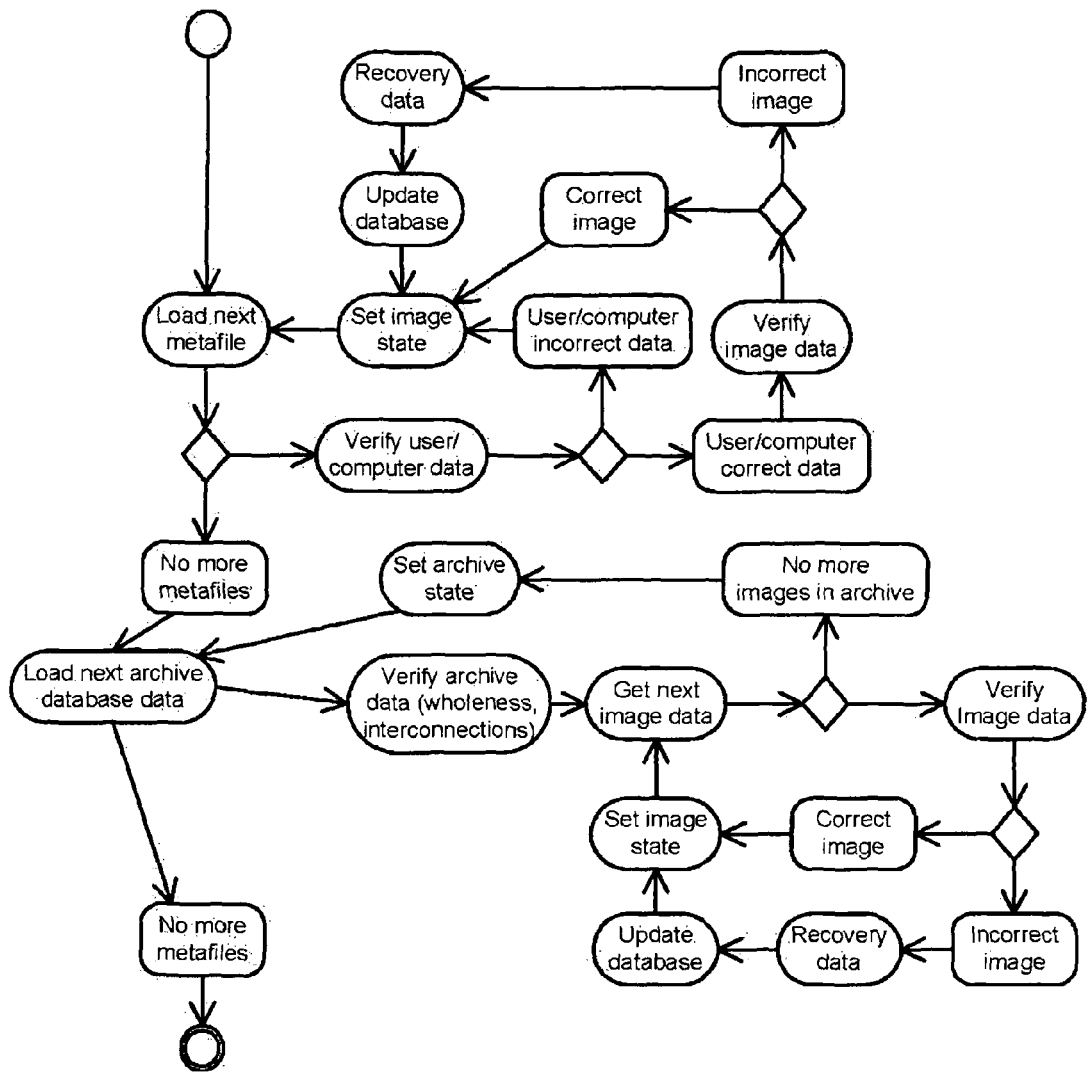
FIGS. 15 and 16 illustrate the process of data integrity verification based on location.
Figure 16:
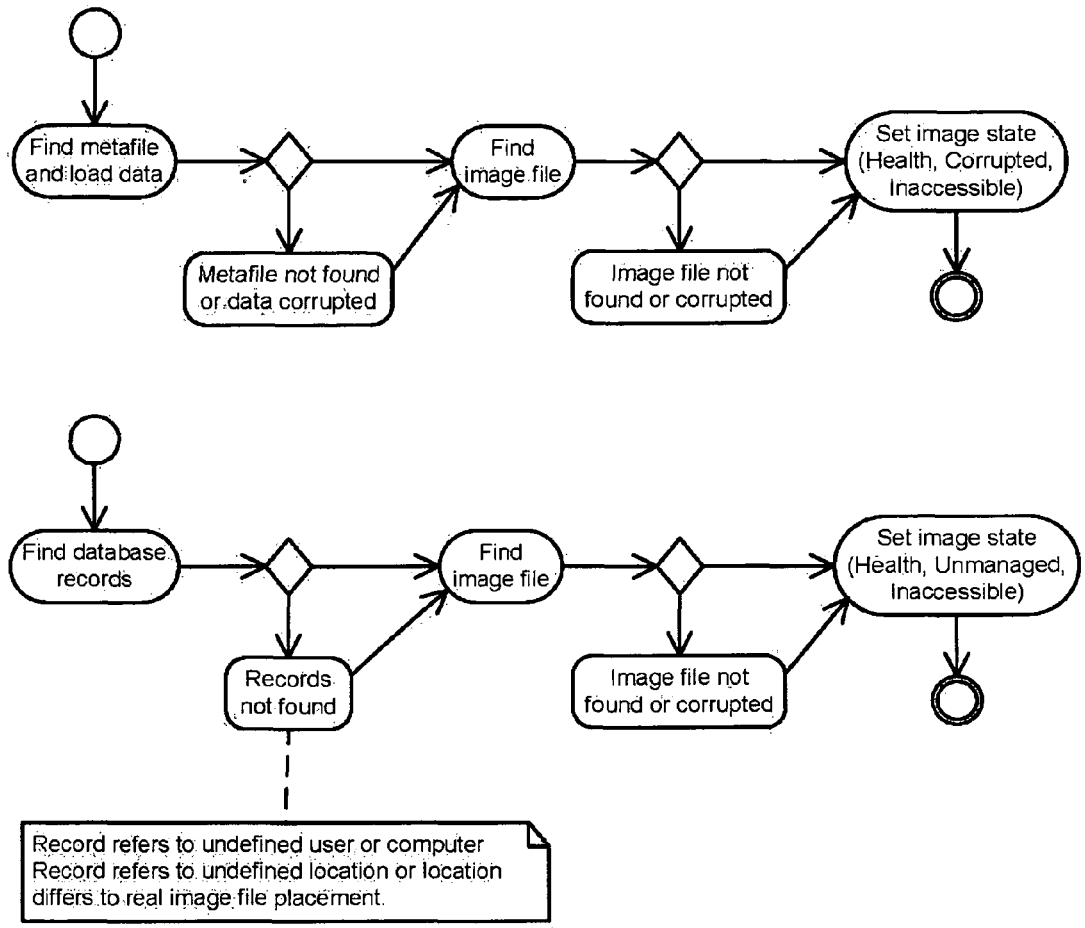

FIGS. 15 and 16 illustrate the process of data integrity verification based on location, with FIG. 15 illustrating data integrity verification based on data in the database, and FIG. 16 illustrating the same process based on data in the metafile.

As a result of the verification check using the command Location::Verify( ), the location receives one of the following states:

| | State | Description |
| --- | --- | --- |
| 1 | Health | All records correspond to the location's contents have full integrity. All backups have full integrity. Location is in a "normal" state. |
| 2 | Superfluous | All records correspond to the location's contents have full integrity. Location has archives that have the state Unmanaged. |

| | State | Description |
|---|---|---|
| 3 | Corrupted | Location or database contains contradictory or damaged entries. Location includes archives that have the state Corrupted or Inaccessible. |
| 4 | Inaccessible | Location cannot be accessed |

As a result of the verification using the command Archive::Verify( ), the archive receives one of the following states:

| | State | Description |
|---|---|---|
| 1 | Health | All data has full integrity and is what is expected, the archive is full. This is the normal state of the archive. |
| 2 | Unmanaged | Archive includes Unmanaged backups. |
| 3 | Corrupted | Archive includes backups that have the state Corrupted or Inaccessible. Base backup is inaccessible |
| 4 | Inaccessible | Base backup is in the state Corrupted or Inaccessible. |

As a result of the verification check using the command Backup::VerifyDBData( ), Backup::VerifyMFData( ), the backup receives one of the following states:

| | State | Description |
|---|---|---|
| 1 | Health | All data has full integrity and is what is expected. This is the normal state of the backup. |
| 2 | Unmanaged | Metadata and the backup is correct, but there are no corresponding entries in the database. Adding the entries to the database will change the state to normal. |
| 3 | Corrupted | Metadata is missing or damaged. |
| 4 | Inaccessible | Backup file is missing or damaged |

The data integrity check is performed when an object's data is loaded, when operations on the object are performed, or when access to the object is granted, as well as when data integrity verification is performed for all of the locations for the particular user or computer. Correction can be performed both on the individual backups, as well as on archives. The purpose of the correction is to modify the object (backup or archive) for further normal operations. Correction of a location assumes that all of the archives in that location will be corrected. Correction of an archive assumes that all of the backups in the archive would be corrected, or correction of the archive itself (except for those backups that for whatever reason cannot be corrected at all). Recovery of an backup can result in the following states, by using the command Backup::Recover( ):

| | State | Action |
|---|---|---|
| 1 | Unmanaged | Add entries to the database |
| 2 | Corrupted | Based on the entries in the database, create the metadata |

Recovery of data from an archive can result in the following states, by using the command Archive::Recover( ):

| | State | Action |
|---|---|---|
| 1 | Unmanaged | For all Unmanaged backups, data correction is invoked |
| 2 | Corrupted | For all Corrupted and Unmanaged backups, data correction is invoked. All Inaccessible are removed. A new archive is created, based on an uninterrupted sequence of backups from the base backup. The old archive and any out-of-sequence backups are deleted. |

Recovery of data from a location, using the command Location::Recover( ) can result in the following states:

| | State | Action |
|---|---|---|
| 1 | Unmanaged | For all Unmanaged archives, data correction is invoked |
| 2 | Corrupted | For all Corrupted and Unmanaged archives, data correction is invoked. All Inaccessible archives are removed |

As an option, correction can be performed on an object automatically, when any (or some) operations are performed on that object.

If, for whatever reason, the database is inaccessible, or damaged, the Backup Server can still function, but it will function in a safe mode. The Backup Server, in this case, cannot be used as a target for creating backup copies of data, since with the database inaccessible, the Backup Server cannot be given certain tasks, and tasks given to it previously will not be completed. In this case, the administrator has the following options:

1. connect the database to the server, by using the command Backupserver::DBconnect( ).
2. create a new database, and connect to it, by using the command Backupserver::DBrecreate( ).
3. select database, and connect to it, by using the command Backupserver::DBset( ).
4. with the database connected, perform any of the normal operations.
5. with the database connected, transition to a normal operating mode, by using the command Backupserver::SetNormalMode( ).
6. disconnect database, by using the command Backupserver::DBDisconnect( ).

Operation in a safe mode can also occur not just due to an error in accessing the database, but due to a command from an administrator (manually), or by giving the command Backupserver::SetSafeMode( ). In the latter case, the database is not disconnected.

In addition to directly servicing the data in the archives, when a problematic situation arises, the Backup Server can also perform operations on special data relating to archive migration. Data relating to migration, which applies to the entire location, can be recovered from the metadata of the location. However, data regarding migration policies for the particular users and computers can only be verified for integrity, and, if necessary, automatically corrected.

The Backup Server also supports various migration capabilities. Generally, the subject of migration can be divided into several areas:

1. storage of migration schemes and storage parameters
2. expansion of Backup Server functionality to implement tasks
3. interaction of the Backup Server, the administration console and the Group Server for the purposes of migration.

Figure 17:
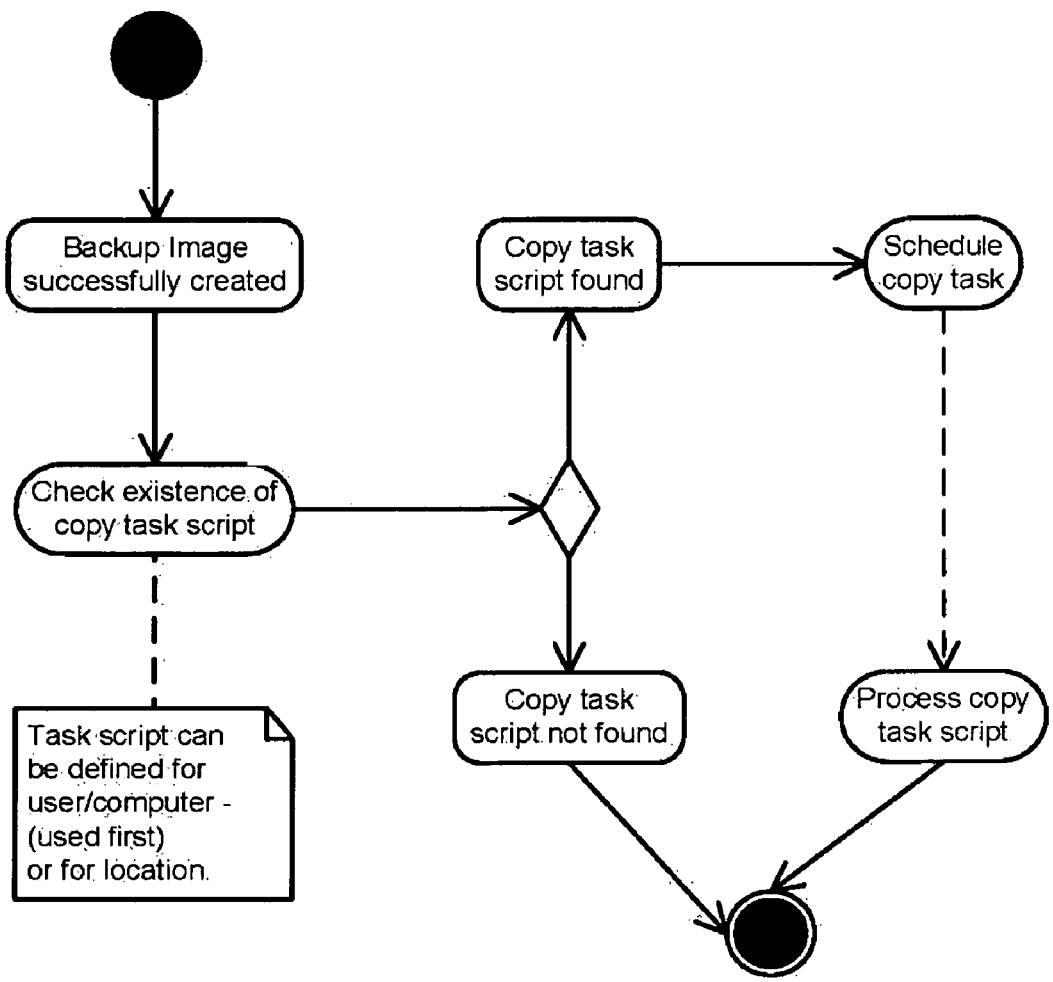
FIG. 17 illustrates the actions taken by the Backup Server after the new backup is created.

FIG. 17 illustrates the actions taken by the Backup Server after the new backup is created. Generally, mirroring can be implemented by setting tasks for the Backup Server relating to copying and/or moving of backups to different locations. For each user or computer or location, a script can be defined, which would be executed immediately after a new backup is created. The script is stored in the database, and is used by a daemon which is started after the task, such as copying and/or moving of backups to different locations, is completed.

Figure 18:
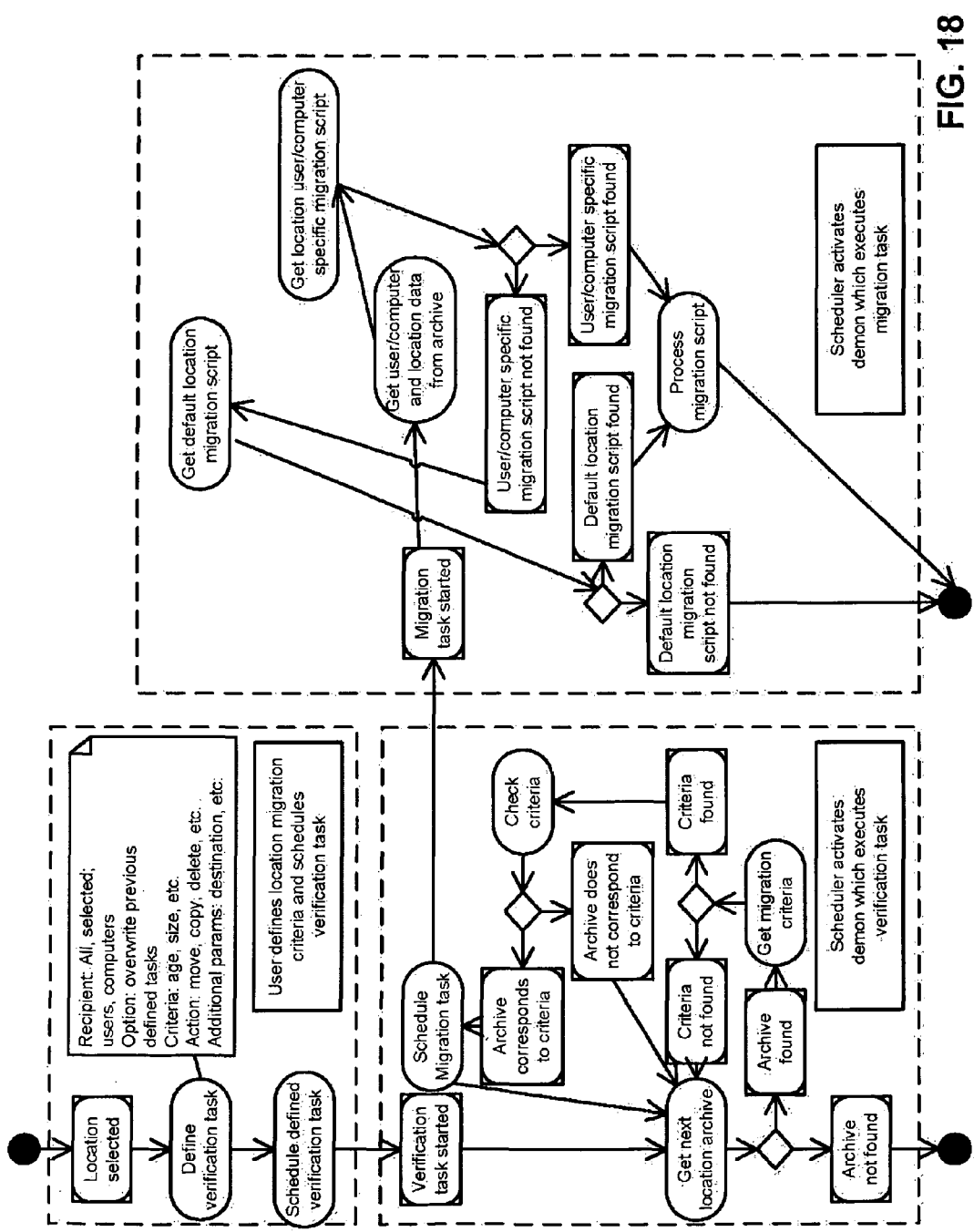
FIG. 18 illustrates how the tasks, such as copying and/or moving of backups to different locations, for archive migration are set and executed.

FIG. 18 illustrates how the tasks, such as copying and/or moving of backups to different locations, for archive migration are set and executed. For each location, the tasks for archive verification can be set. The tasks are implemented using a data walker script. The archive checking script is the same for all locations, the script essentially going to the archives in each location one by one, verifying the integrity of each archive, and setting (where necessary) the tasks for processing the archives. When the verification script is executed, scripts for checking the criteria for the corresponding pairs (users/computer plus location) are taken from the Backup Server's database. Note that the criteria can be different for different locations, for example, such parameters as archive age, archive size, etc. If the parameters are what they should be, the task for the archive is set, where the actions in the task are defined—in this case, migration. The migration itself can be executed immediately, or after completion of certain other tasks. Note that parameters can be replaced by script in the database, which permits the Group Server to set more complex task for servicing of the archives.

Figure 19:
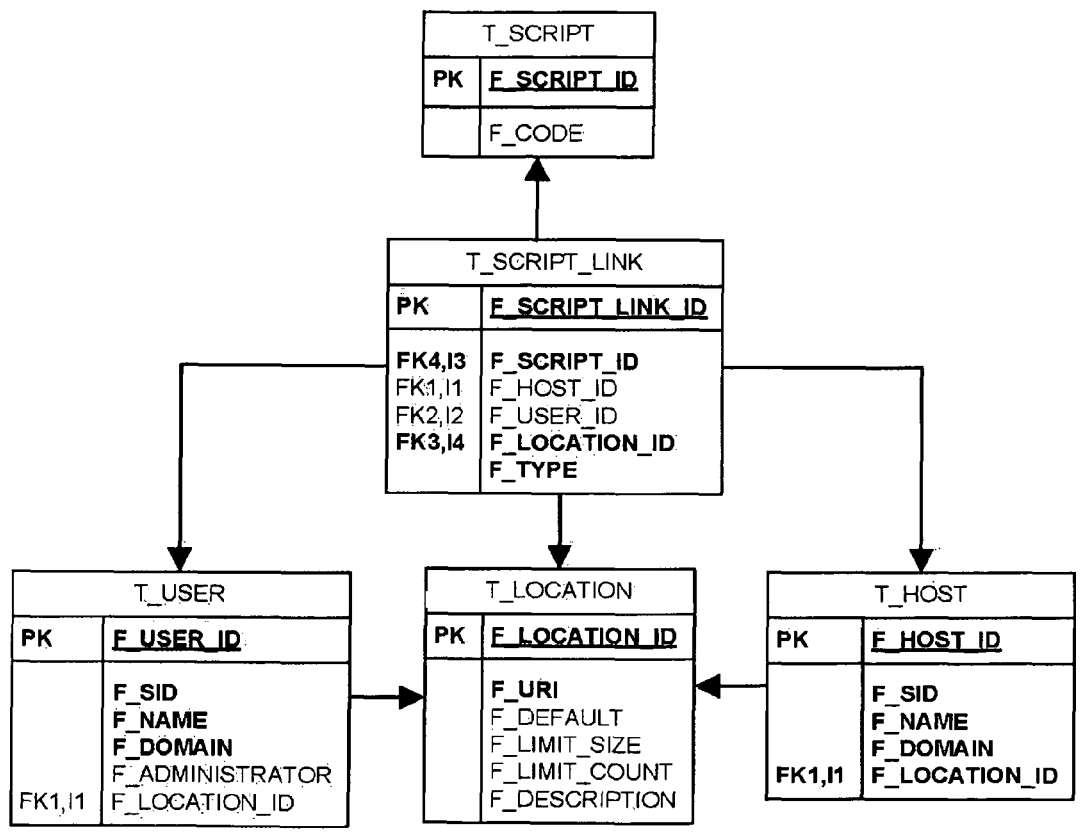
FIG. 19 illustrates the action scripts part of structure of the database of the Backup Server.

Scripts used for archive verification, archive migration, backup migration, data integrity verification, backup consolidation, and similar tasks, are generally referred to as data walker scripts. Scripts are stored in a separate table in the Backup Server database, and used by users, computers and locations. Such scripts can be created by using Wizards of the Backup Server, as well as the Group Server that has an installed Backup Server support module. FIG. 19 illustrates the action scripts part of structure of the database of the Backup Server.

Scripts can also be stored not in their final form, but also in the form of parameters used to form the script. However, this does not affect the architecture of the Backup Server, but only affects the way in which the daemon performs its tasks, and how the Wizards prepare the script.

To implement migration, the Backup Server needs to expand its functionality from migration only, which is done by adding classes and methods to existing classes.

The script is an additional class that contains information about the location and the computer/user for which this script is defined, as well as the script code itself. Each script has its own unique identifier, which is used by the scheduler to launch the script, as well as its own script type. The script code is usually formed by the Wizards, and can be different depending on the task. In the case of migration, the verification type script contains archive checking criteria and a script identifier, which will be executed for those archives that fit the criteri(a) The migration code also includes the target location, and the actions performed on the archive.

The script can be received from the location, by defining the user or the computer, for which the script is defined, or without identifying the location for the script, using the default value, but defining the type of the script (verification, migration, etc.), by using the command Location::Script( ). Similarly, the default scripts for locations or for individual users or computers can also be set. Additionally, the script can be accessed by using its identifier, which the daemon does upon being invoked by the scheduler. The daemon knows for whom it is executing the script: for the location (in the case of verification) or for the archive, in the case of migration. Some scripts, which are execute simple operations (consolidation, deletion, etc.) can be predefined on the Backup Server, and do not need to be associated with the location or with the computer/user.

All classes that represent locations, users, computers, etc. that have relationships to each other must provide an interface for receiving script. On the other hand, all these classes must have interfaces that the script can access.

The administrator can define the migration policies for the archives that are stored on the Backup Server by using either the Backup Server console or the Group Server. Direct management of the Backup Server permits defining a migration policy for each location by using a wizard, the wizard defines the following:

1. archive selection criteria;
   a. users and computers, to which the archives belong. In the case where the action is performed for all users and computers, an additional migrating or deletion can be defined based on the additional parameters, such as:
   b. archive age, at which the action will be performed
   c. archive size (in terms of number of backups) at which the action will be performed
   d. archive size in bytes, at which the action will be performed
   e. for parameters b, c, d, the following needs to be defined:
      i. is the condition sufficient?
      ii. must the condition be satisfied?
   f. schedule of the archive check, based on the criteri(a) By default, the check will be performed only as part of a general location verification, or as part of the verification for all of the locations.
   g. Mirroring. If this parameter is selected, a script will be defined for copying of the new backup, where the script will be executed directly after the backup is created. In this case, parameters b-f are not set.
2. Action parameters:
   a. Type of action (copying, moving, removing/deletion). For mirroring, only copying is relevant.
   b. Location to which the data will be moved or copied to (except in the case of deletion).
   c. Schedule of the action (immediately, delayed, at a predefined time).
   d. The Group Server, having information about the groups of computers or users, can set more complex tasks relating to migration, and can distribute the migration policy for the various archives by setting up tasks for the users and computers, or by defining the location scripts, as they relate to migration and verification. The Group Server can also use an interface for the Backup Server and wizards for it.

The backup server, as noted earlier, stores the archives in locations. The physical correspondence between the locations and the actual peripheral devices is defined by the administrator. Such storage locations can be, for example, folders on a disk drive, where each user is offered a folder, such as those familiar to Microsoft Windows users, through which he can access his backup data. Note that the organization into folders is essentially a graphical user interface device, and does not necessarily affect the actual organization of data on the backup server.

FIG. 20 illustrates the process of archive consolidation. Note that FIG. 20 illustrates a general case of archive consolidation. FIG. 21 also illustrates the process of archive consolidation, but for a particular selected archive.

FIG. 22 illustrates how, given two archives, a single archive and two incremental archives can be generated. In other words, the two archives are analyzed, common elements in both are identified, and are placed into a single archive. The incremental archives are then generated, relative to the common (base) archive.

FIG. 23 is another representation of the process of FIG. 22. Shown in FIG. 23 on the left hand side are two archives, and on the right hand side a single base archive and incremental archives.

FIG. 24 illustrates the process of archive verification, and determination of whether the particular archive needs to be moved to a different location. This figure describes how, based on specified criteria, the archive is either moved to the location (migrated) to a particular user defined location, or, if it does not satisfy the criteria is not moved.

FIG. 25 illustrates the operation of a user console for managing the archiving. FIG. 26 illustrates the various tasks that are activated if the consolidation process is invoked.

FIG. 27 describes the process of recovery of the backup server. For example, if the backup server is in any of the non-functional states, such as failed, crashed, etc., for example, the server "pings," or the database is corrupted or the host computer is corrupted, FIG. 27 describes the various processes used to recover functionality of the backup server.

FIG. 28 illustrates a case where a copy of the archive might need to be created. In this case, for example, the user might want not just a single archive, but to have a backup copy of the same archive. In that case, the task for creation of a copy of the archive is scheduled, as illustrated in FIG. 28. In other words, here the user can specify that he wants the backup to go to location 1, and also to location 2. Once the backup to location 1 is completed, a copy is also made to location 2.

FIG. 29 is a table that illustrates how data, particularly service data of the backup server is organized. In essence, the database stores such parameters as whose doing the backup, what is being backed up, and where it is being backed up. Also, this table stores information regarding the backup server's database, the locations, size and disk space allocations, user allocations and restrictions, and so forth.

FIG. 30 is a table of archive-based data. In other words, this information is kept on the backup server, but shows the archive view of the data. Also, this table contains links between the archive-related metadata, etc.

FIG. 31 illustrates interaction between various elements of the overall system. In other words, FIG. 31 shows the archives are moved between the various hardware elements.

FIG. 32 is an illustration of how the system handles the health of the archives. For example, the system checks if the archives cannot be found, have been corrupted, and so forth.

FIG. 33 illustrates some location-related service data, as it is kept in the backup server's database. FIG. 34 is a schematic illustration of the interaction between the archives, users, and various computers involved in the system. FIG. 35 shows an example how physical storages are organized within three pools.

All incoming data associated with a restore point is received into the incoming pool, and is distributed to the locations in the incoming pool (typically there will be several locations, although, in the degenerate case, a pool can have only one location). Optionally, the pools can be organized such that they contain only locations of the same type, for example, only local (online) locations, remote (network) locations, removable (tape) locations, such that the locations are used in the same manner if they belong to the same pool. Each pool can have its own criteria for how data associated with restore point is deleted from this pool or moved from this pool to the next older pool (in the example of FIG. 35, moving data from the incoming pool to the second pool, and from the second pool to the last pool, although it will be appreciated that the number of pools is not limited, and their hierarchical organization is not limited to the three pools shown in FIG. 35. Such criteria can include, for example, the age of the restore point, the size of the data associated with that restore point, and so on—generally, this can be expressed as a logical equation, which gives a predictable result in every case for whether to move the restore point into the next older pool.

FIG. 36 illustrates how at some point in time, some of the restore points are designated for redistribution to the next older pool. In this case, in the incoming pool, restore points labeled PIT02 and PIT04 are subject to deletion from the incoming pool, and moved to the second pool. The restore point PIT03 is deleted from the second pool and not moved to the last pool, and the restore point PIT05 is deleted from the last pool altogether.

Thus, when the backup server has several pools and separate criteria for each pool, it is possible to trace the "life" of a particular restore point, from the moment it enters the incoming pool, to the moment it is deleted from the last pool. Such "lives" of a pool can be, for example:

A simple life is where only a single incoming pool is used, with removal from the pool based on age of the restore points, and archiving to removable tape.

A more complex scenario involves two pools, where data is moved from the incoming pool to the second pool, based on some criteria, such as the age of the restore point, and removal from the second pool to some other storage medium, such as removable tape, or deletion altogether.

A still more complex scenario involves three pools, with successive movements of a restore points from the first pool to the second pool to the third pool, and optionally, in some cases, some restore points are deleted altogether (for example, only some fraction of the restore points are moved from the second pool to the last pool—but not all the restore points.

Note also that such organization as described here permits a relatively flexible approach to scalability to backup storage, and a relatively flexible approach to how the life of each restore point is managed. Note also that a particular restore point can be both "frozen"—in other words, prevented from being deleted and/or moved to the older pool. This may be useful when a particular restore point contains data that is higher than average in importance, or where a particular checkpoint contains data where rapid access to the data may be necessary.

The archives are distributed inside the pools as follows:

Once restore points, from all users, are received in the incoming pool, they are distributed evenly throughout the locations. Note that dependent restore points are placed in the same location (in other words, the base backup and its increments). This also improves the reliability of the storage. If a location is lost, a greater number of restore points for a greater number of clients is recoverable.

Similarly, when a restore points is moved from one pool to another, they are distributed evenly throughout the locations.

Note that dependent restore points are placed in the same location (in other words, the base backup and its increments). This also improves the reliability of the storage. If a location's storage is damaged, a greater number of restore points for a greater number of backups are accessible.

Depending on the archiving scheme, on the backup server side, the incoming pool includes a base backup from the last incremental restore point, and incremental restore points are added to that base backup. Note that the user need not create complete base restore points. The distribution of the restore point archives into locations is illustrated in FIG. 37.

FIG. 38 illustrates how archives can be organized into personal folders, in this case, a logical distribution of the archives. As shown in FIG. 38, the backup server contains a number of personal folders, labeled Personal Folder 01, Personal Folder 02, Personal Folder 03, etc., which corresponds to user01, user 02, and so on. Note that a user can have several personal folders, in this case, as shown in FIG. 38, Personal Folder 01 and Personal Folder 02 both belong to user01, and Personal Folder 01 and Personal Folder 02 (obviously different folders) belong to user02. In FIG. 38, the new index corresponds to the user (u01, u02, etc.), and the A index corresponds to the archive (archive01-A01, archive02-A02, archive03-A03, and so on). In FIG. 38, for user01 archives 01, 02, 04 are associated with Personal Folder 01 for that user, and archives 03, 05 and 06 are associated with Personal Folder 02 for user 01.

The storage locations can be, for example, folder on a disk, CD/DVD storage device, or an automated library, a tape drive or a tape library, network resources, such a SAN or NAS, or FTP/SFTP servers or resources.

Locations have the following properties: each location has a path (generally, the path should enable determination of the type of storage device at issue), type (such as local location, remote location, removable location), size (physical size in bytes), if able to obtain, and the amount of space, which can be used for storing backups, specified by the administrator.

Those locations that are selected for storage can be organized into pools. In one embodiment, the backup server has at least one pool (for incoming data), with at least one location associated with that pool. Generally, there will be several pools, organized in terms of the time of the backup, with the most recent backups stored in the incoming pool, older backups stored in a different pool, and the oldest backups stored in the last pool. Typically, the older the data, the less the likelihood that it will ever be needed (and generally, the less the likelihood that it will be needed quickly—therefore, for the oldest data, stored in the last pool, see FIG. 38, these storage devices can be the slowest devices in the system, such as tape drives. For the incoming data pool, the storage devices would tend to be the fastest and those accessible most easily, such as local disk drive of the backup server. This is illustrated in FIG. 38, which shows the distribution of archives in personal folders.

The backup server also provides an interface "Place" that the user can use to receive storage for his archives. This means that the backup server can be used as any other storage device (Place). When the Place is opened, the user only needs to specify the path to the backup server and the virtual holder as part of the path definition: aties:\\bsp:\localhost\Personal Folder 01

Redirection links between the archives and the virtual folders are also scored in the backup server's database.

The administrator can set up limits for each location. Such limits permit the administrator to know in advance when a particular location is running out of space, and perform forcible maintenance activities, such as unplanned deletion of restore points, or moving restore points from pool to pool. When the limits are exceeded, this does not necessarily mean that the backup server is no longer functioning, or that new restore points cannot be stored, however, this is generally an indication that some sort of critical condition is approaching. For example, if the capacity that is allocated to a particular location is 90%, or 95% used up, or 10 GB left, or 2 TB used up, this can be an indication that a critical state is approaching, and warnings (to the user and/or to the administrator) can be generated.

Management of access rights to the personal folder is done through the Group Server, discussed earlier. The access rights to the data and the personal folders (i.e., the backups, the archives, the restore points, and so on) depend on access rights to the personal folder itself. Links between users and the virtual folders are determined by the Group Server.

With reference to FIG. 39, an exemplary system for implementing the invention includes a general purpose computing device in the form of a personal computer or server 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help to transfer information between elements within the personal computer 20, such as during start-up, is stored in ROM 24.

The personal computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM, DVD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35 (preferably Windows™ 2000). The computer 20 includes a file system 36 associated with or included within the operating system 35, such as the Windows NT™ File System (NTFS), one or more application programs 37, other program modules 38 and program data 39. A user may enter commands and information into the personal computer 20 through input devices such as a keyboard 40 and pointing device 42. Other input devices (not shown) may include a microphone, joystick, game pad, satellite dish, scanner or the like. These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The personal computer 20 may operate in a networked environment using logical connections to one or more remote computers 49. The remote computer (or computers) 49 may be another personal computer, a server, a router, a network PC, a peer device or other common network node, and typically includes many or all of the elements described above relative to the personal computer 20, although only a memory storage device 50 has been illustrated. The logical connections include a local area network (LAN) 51 and a wide area network (WAN) 52. Such networking environments are commonplace in offices, enterprise-wide computer networks, Intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

It will be understood by those skilled in the art that various changes in form and details may be made therein without departing from the spirit and scope of the invention as defined in the appended claims. Thus, the breadth and scope of the present invention should not be limited by any of the above-described exemplary embodiments, but should be defined only in accordance with the following claims and their equivalents.

What is claimed is:

1. A method for managing archived data, the method comprising:
   creating a plurality of images of storage devices of computing systems and for different users, each image representing a state of a particular storage device at a particular point in time and being associated with a restore point of the particular storage device that allows restoring the particular storage device to that point in time;
   storing the images for the different users in different storage locations, the storage locations being controlled by a single backup server and belonging to storage pools,
   wherein the backup server stores information regarding a relationship of images to each other, and any relationships of files within the backups,
   wherein multiple locations of one user are stored in different pools on different storage devices, the different pools having different access speed,
   wherein a personal folder is created for each user, and all user's images are associated with the user's personal folder, and
   wherein access rights to data in the personal folders depend on access rights to the personal folder itself; and
   moving contents of locations of one user from one pool to another in predefined direction, simultaneously with reorganizing images within the locations, and deleting the contents in the one pool after the moving step.

2. The method of claim 1, wherein each image is a backup of one user's data.

3. The method of claim 1, wherein at least some of one location's content is frozen so that it is never moved from one pool to another.

4. The method of claim 1, wherein the storage devices of locations of different pools differ from each other by type, such that storage devices in a first pool are hard disk drives, storage devices in the next pool are SAN storage devices, or an NAS storage devices, and a storage device in the next pool is a network disk drive accessible through a network and a storage device in the next pool is a magnetic tape drive.

5. The method of claim 1, wherein the storage devices of locations of different pools have different access speed, such that the storage device in the first pool having the highest access speed.

6. The method of claim 1, wherein the client application for managing images is installed on the user's computer, and the server application for managing images is installed on a server.

7. The method of claim 6, wherein user's computers with installed client application for managing images are connected to the server, with the installed server application for managing images used to create the images.

8. The method of claim 7, wherein user's computers with installed client application for managing images are connected to the server, with the installed server application for managing images to restore data from the images created by the users.

9. The method of claim 6, wherein a separate group server checks access rights of users to the backup server.

10. The method of claim 1, wherein the images belong to multiple users, and wherein each user can manage images based on his access rights.

11. The method of claim 1, wherein some of the location's content can be deleted if it is out of data.

12. The method of claim 1, wherein one user's images selected for consolidation are all within one location or have been previously consolidated.

13. A system for managing archived data, the system comprising:
   a plurality of images of storage devices of computing systems and for different users, each image representing a state of a particular storage device at a particular point in time and being associated with a restore point of the particular storage device that allows restoring the particular storage device to that point in time;
   different storage locations storing the images for the different users, the storage locations being controlled by a single backup server and belonging to storage pools, the different storage pools having different access speed,
   wherein multiple locations of one user are stored in different pools on different storage devices; and
   a backup server that moves contents of locations of one user from one pool to another in a predefined direction, simultaneously with reorganizing images within the locations, and deletes the contents in the one pool after the moving,
   wherein the backup server stores information regarding a relationship of images to each other, and any relationships of files within the backups,
   wherein multiple locations of one user are stored in different pools on different storage devices, the different pools having different access speed,
   wherein a personal folder is created for each user, and all user's images are associated with the user's personal folder, and wherein access rights to data in the personal folders depend on access rights to the personal folder itself.

14. The system of claim 13, wherein each image is a backup of one user's data.

15. The system of claim 13, wherein at least some of one location's content is frozen so that it is never moved from one pool to another.

16. The system of claim 13, wherein the storage devices of locations of different pools differ from each other by type, such that storage devices in a first pool are hard disk drives, storage devices in the next pool are SAN, or an NAS, and a storage device in the next pool is a network disk drive accessible through a network and a storage device in the next pool is a magnetic tape drive.

17. The system of claim 13, wherein the storage devices of locations of different pools have different access speed, such that the storage device in the first pool has the highest access speed.

18. The system of claim 13, further comprising a separate group server that checks access rights of users to the backup server.

19. The system of claim 13, wherein a personal folder is created for each user, and all images of that user are associated with that user's personal folder.

* * * * *